United States Patent
Kurisawa et al.

(10) Patent No.: US 11,415,840 B2
(45) Date of Patent: Aug. 16, 2022

(54) LIQUID CRYSTAL DISPLAY DEVICE

(71) Applicant: DIC Corporation, Tokyo (JP)

(72) Inventors: Kazuki Kurisawa, Kita-adachi-gun (JP); Yuichi Inoue, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 17/042,303

(22) PCT Filed: Apr. 25, 2019

(86) PCT No.: PCT/JP2019/017603
§ 371 (c)(1),
(2) Date: Sep. 28, 2020

(87) PCT Pub. No.: WO2019/216233
PCT Pub. Date: Nov. 14, 2019

(65) Prior Publication Data
US 2021/0026206 A1    Jan. 28, 2021

(30) Foreign Application Priority Data

May 9, 2018   (JP) .............................. JP2018-090634

(51) Int. Cl.
*G02F 1/1343*    (2006.01)
*C09K 19/12*    (2006.01)
(Continued)

(52) U.S. Cl.
CPC ........ *G02F 1/134309* (2013.01); *C09K 19/12* (2013.01); *C09K 19/3003* (2013.01);
(Continued)

(58) Field of Classification Search
CPC .... G02F 1/134309; G02F 1/13; G02F 1/1337; G02F 1/1343; G02F 1/133711;
(Continued)

(56) References Cited

U.S. PATENT DOCUMENTS

2003/0043336 A1    3/2003   Sasaki et al.
2011/0242443 A1*  10/2011   Choi ................. G02F 1/134309
                                                          349/38
(Continued)

FOREIGN PATENT DOCUMENTS

JP    2003-149647 A    5/2003
JP    2014-74797 A    4/2014
(Continued)

OTHER PUBLICATIONS

International Search Report dated Jul. 2, 2019, issued in counterpart International Application No. PCT/JP2019/017603 (2 pages).

*Primary Examiner* — Ruiyun Zhang
(74) *Attorney, Agent, or Firm* — WHDA, LLP

(57) ABSTRACT

The present invention provides a liquid crystal display device that includes a first substrate having an electrode A formed thereon; a second substrate having an electrode B formed thereon and being disposed to oppose the first substrate; and a liquid crystal layer disposed between the first substrate and the second substrate and substantially vertically aligned with respect to the first and second substrates when no voltage is applied between electrodes, in which the electrode A has a fishbone pattern having a branched portion, and a space (S μm) between adjacent branches of branches of the fishbone pattern and an inter-substrate distance (d μm) between the first substrate and the second substrate satisfy a relationship of formula (1):

$(d-0.6)/1.25 < S < (d+1.1)/1.25$      formula (1).

9 Claims, 4 Drawing Sheets

(51) Int. Cl.
*C09K 19/30* (2006.01)
*C09K 19/32* (2006.01)
*C09K 19/34* (2006.01)
*G02F 1/1337* (2006.01)
*C09K 19/04* (2006.01)

(52) U.S. Cl.
CPC ........ *C09K 19/3066* (2013.01); *C09K 19/322* (2013.01); *C09K 19/34* (2013.01); *G02F 1/133711* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/328* (2013.01); *C09K 2019/3422* (2013.01); *C09K 2323/00* (2020.08)

(58) Field of Classification Search
CPC ........... C09K 2323/00; C09K 19/3003; C09K 19/3066; C09K 19/322; C09K 19/34; C09K 2019/0448

USPC .......... 428/1.1; 349/191, 155, 144, 139, 130
See application file for complete search history.

(56) References Cited

U.S. PATENT DOCUMENTS

| | | | |
|---|---|---|---|
| 2016/0011471 A1* | 1/2016 | Tsai | G02F 1/134309 349/142 |
| 2017/0235194 A1* | 8/2017 | Shin | G02F 1/13439 349/139 |
| 2019/0264108 A1 | 8/2019 | Kimura et al. | |

FOREIGN PATENT DOCUMENTS

| JP | 2018-4811 A | 1/2018 |
|---|---|---|
| WO | 2018/079333 A1 | 5/2018 |
| WO | 2018/105381 A1 | 6/2018 |

* cited by examiner

150 µm

LIQUID CRYSTAL DISPLAY DEVICE

TECHNICAL FIELD

The present invention relates to a liquid crystal display device useful as a constituent member of a liquid crystal television or the like.

BACKGROUND ART

Liquid crystal display devices are used in watches, calculators, various measurement instruments, automobile panels, word processors, electronic notepads, printers, computers, liquid crystal televisions, clocks, advertising boards, etc. Representative examples of the liquid crystal display mode include twisted nematic (TN) mode, super-twisted nematic (STN) mode, vertical alignment (VA) mode that uses thin-film transistors (TFTs), in-plane switching (IPS) mode, and fringe field switching (FFS) mode.

These liquid crystal display devices desirably achieve higher speed response to improve video characteristics, and thus there is an increasing demand for a narrower cell gap. In related art, the cell gap has been about 4 μm, but a narrower gap is desirable. From the viewpoint of improving contrast, the value of the product of the cell gap (d) and the refractive-index anisotropy (Δn) of the liquid crystal composition used in a liquid crystal display device must be optimized, and thus the liquid crystal composition desirably has a high Δn. In the case of a liquid crystal display device of a related art having a cell gap of about 4 μm, the contrast can be improved by adjusting the Δn of the liquid crystal composition. However, when the cell gap is 3.6 μm or less and, in particular, when an electrode having a fishbone pattern is used, the contrast could not be sufficiently improved by merely adjusting the Δn of the liquid crystal composition (for example, refer to PTL 1).

CITATION LIST

Patent Literature

PTL 1: Japanese Unexamined Patent Application Publication No. 2014-74797

SUMMARY OF INVENTION

Technical Problem

The present invention has been made under the aforementioned circumstances, and provides a method for improving various properties of a liquid crystal display device and improving the contrast with narrower cell gaps.

Solution to Problem

The inventors of the present invention have studied structures of various liquid crystal display devices to address the issue described above, and have found that the issue can be resolved by using a particular electrode structure. Thus, the present invention has been made.

That is, the present invention provides:

a liquid crystal display device that includes a first substrate having an electrode A formed thereon;

a second substrate having an electrode B formed thereon and being disposed to oppose the first substrate; and a liquid crystal layer that is disposed between the first substrate and the second substrate and is vertically aligned with respect to the first and second substrates when no voltage is applied between the electrodes, wherein the electrode A has a fishbone pattern having a branched portion, and a space (S μm) between adjacent branches of branches of the fishbone pattern and an intersubstrate distance (d μm) between the first substrate and the second substrate satisfy a relationship of formula (1):

$$(d-0.6)/1.25 < S < (d+1.1)/1.25 \qquad \text{formula (1)}$$

Advantageous Effects of Invention

The present invention can provide a liquid crystal display device that exhibits excellent contrast and response speed.

DESCRIPTION OF EMBODIMENTS

<Liquid Crystal Display Device>

A liquid crystal display device of the present invention includes a liquid crystal layer containing a liquid crystal composition and being sandwiched between a pair of substrates, and is based on the principle that liquid crystal molecules in the liquid crystal layer work as optical switches when a voltage is applied to the liquid crystal layer and induces Freedericksz transition of the liquid crystal molecules. In this respect, a widely known common technique can be used.

In general, in a typical vertical alignment liquid crystal display device in which two substrates have electrodes for inducing the Freedericksz transition of liquid crystal molecules, a mode in which charges are applied vertically between these substrates is employed. In such a case, one of the electrodes serves as a common electrode, and the other serves as a pixel electrode. In the description below, the most typical embodiment of this mode is described.

Figure 1:
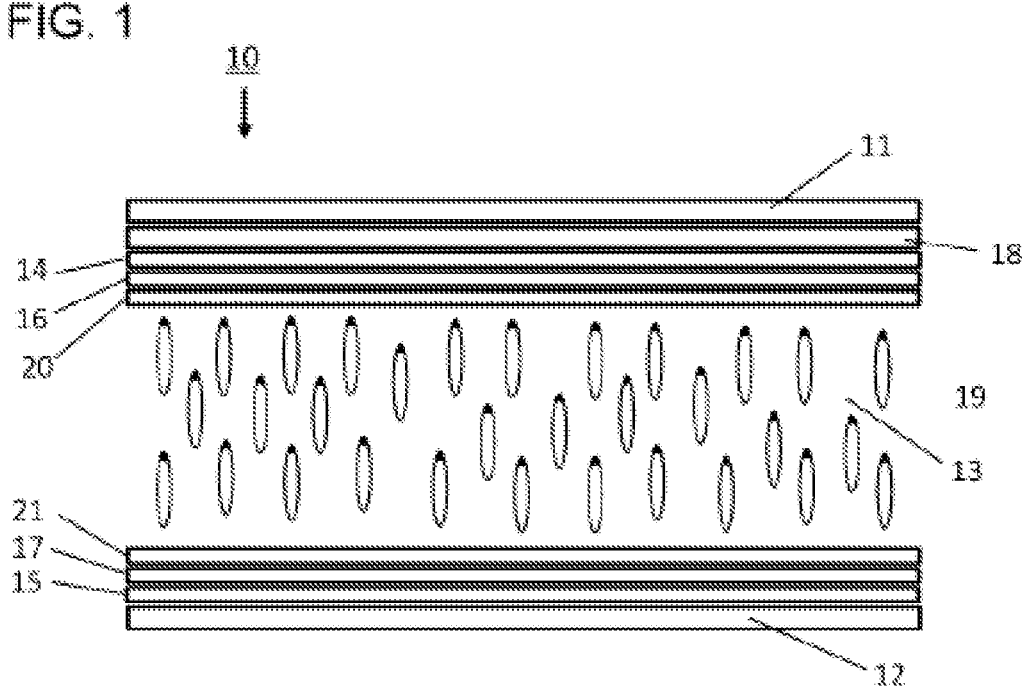
FIG. 1 is a schematic perspective view of one embodiment of a liquid crystal display device of the present invention.

FIG. 1 is a schematic perspective view of one embodiment of the liquid crystal display device of the present invention.

A liquid crystal display device 10 of this embodiment is generally constituted by a first substrate 11, a second substrate 12, a liquid crystal layer 13 that is sandwiched between the first substrate 11 and the second substrate 12 and contains a liquid crystal composition, a common electrode 14 disposed on a surface of the first substrate 11 opposing the liquid crystal layer 13, a pixel electrode 15 disposed on a surface of the second substrate 12 opposing the liquid crystal layer 13, and a color filter 18 disposed between the first substrate 11 and the common electrode 14.

For example, glass substrates or plastic substrates are used as the first substrate 11 and the second substrate 12.

Substrates formed of a resin such as an acrylic resin, a methacrylic resin, polyethylene terephthalate, polycarbonate, a cyclic olefin resin, or the like are used as the plastic substrates.

The common electrode 14 and the pixel electrode 15 are typically composed of a transparent material such as indium-doped tin oxide (ITO).

The pixel electrode 15 is arranged in a matrix form on the second substrate 12. The pixel electrode 15 is controlled by drain electrodes of active elements such as TFT switching elements (not illustrated), and the TFT switching elements have gate lines serving as address signal lines and source lines serving as data lines arranged in a matrix form.

The pixel electrode 15 has two or more domains in a pixel in which the liquid crystal molecule pretilt directions are different. As such, the liquid crystal molecule pretilt directions are regulated so that a pixel is divided into several domains in which the direction in which the liquid crystal molecules tilt in a pixel differs, and, as a result, viewing angle properties are improved.

In order to divide pixels, an electrode having a fishbone pattern is used in each of the pixels. The pixel electrode may be an electrode having a fishbone pattern or the common electrode may be an electrode having a fishbone pattern; however, the pixel electrode is preferably an electrode having a fishbone pattern. Strip-shaped slits are arranged at particular spaces.

Figure 2:
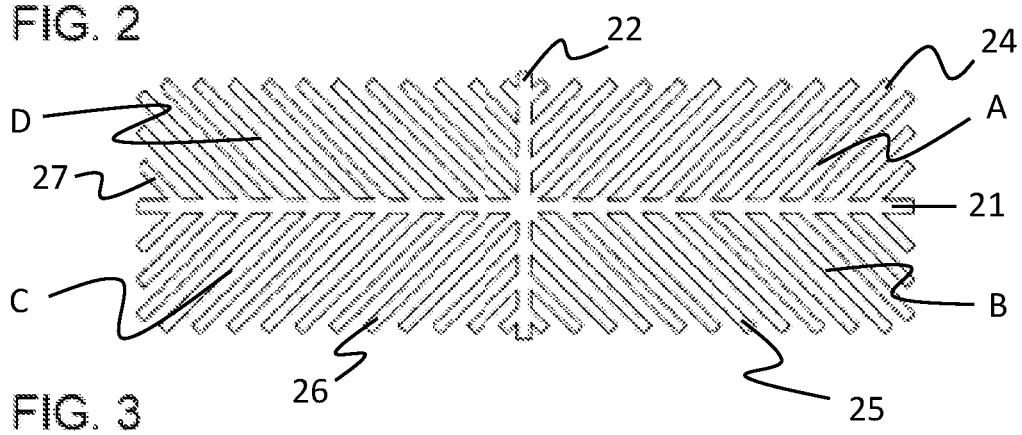
FIG. 2 is a schematic plan view illustrating one example of an electrode (comb electrode) having a fishbone pattern used in the liquid crystal display device of the present invention.

FIG. 2 is a schematic plan view illustrating a typical form of an electrode having a fishbone pattern used as a pixel electrode when a pixel is divided into four domains. This slit electrode has comb-tooth-like slits extending in four directions from the center of a pixel so that, in each pixel, the liquid crystal molecules substantially vertically aligned with respect to the substrates in the absence of the applied voltage will move closer to horizontal alignment as a voltage is applied and the directors of the liquid crystal molecules are oriented in four different directions. As a result, since the liquid crystal molecule alignment direction in the pixel can be divided into plural directions, extremely wide viewing angle properties are exhibited. As shown in FIG. 2, the fishbone pattern includes a first main electrode line 21 and a second main electrode line 22 to form a first region A, a second region B, a third region C and a fourth region D. A first electrode branches 24 is formed in the first region A. A second electrode branches 25 is formed in the second region B. A third electrode branches 26 is formed in the third region C. A fourth electrode branches 27 is formed in the fourth region D.

The liquid crystal display device 10 preferably has a pixel electrode 15 having slits (in other words, a slit electrode).

As the pixel dividing method, a method that involves using an electrode having a fishbone pattern as the pixel electrode, a method that involves forming structures such as linear projections inside the pixel, a method that involves providing an electrode other than the pixel electrode and the common electrode, and a method that involves forming structures by using a polymer of a polymerizable compound different from the alignment film can be used in combination; however, a method (PSA) that involves forming a structure (alignment control layer) formed of a polymer of a polymerizable compound different from the alignment film is preferable. One or both of the first substrate 11 and the second substrate 12 may have the aforementioned structure, or the structure may be present in the liquid crystal composition.

However, since the electrode having a fishbone pattern does not by itself has a force that drives the liquid crystal molecules in the absence of applied voltage, a pretilt angle cannot be imparted to the liquid crystal molecules. However, in the present invention, a pretilt angle can be imparted by providing an alignment control layer described below, and, a wide viewing angle can be achieved by pixel division by combining the alignment control layer with a pixel-dividing slit electrode.

In the present invention, having a pretilt angle means a state in which, in the absence of an applied voltage, the direction perpendicular to the substrate surfaces (surfaces of the first substrate 11 and the second substrate 12 adjacent to the liquid crystal layer 13) is slightly different from the direction of the director of the liquid crystal molecules.

The liquid crystal display device of the present invention is a vertical alignment (VA) mode liquid crystal display device, and thus the director of the liquid crystal molecules in the absence of an applied voltage is substantially vertically aligned with respect to the substrate surfaces. In general, in order to vertically align the liquid crystal molecules in a VA mode liquid crystal display device, a vertical alignment film formed of polyimide, polyamide, polysiloxane, or the like is disposed between the first substrate and the liquid crystal layer and between the second substrate and the liquid crystal layer; however, at least one of the substrates of the liquid crystal display device of the present invention has no such vertical alignment film. However, if one of the substrates has a vertical alignment film, for example, a transparent organic material such as polyimide, polyamide, or a benzocyclobutene polymer (BCB) can be used. In the liquid crystal display device of the present invention, as with the PSA-mode liquid crystal display device described above, a voltage is applied between the electrodes, and an active energy ray, such as an ultraviolet ray, irradiates slightly tilted liquid crystal molecules to polymerize the polymerizable compound in the liquid crystal composition so as to impart an appropriate pretilt angle. However, in the liquid crystal display device of the present invention, specifically, an alignment control layer is formed by polymerizing a polymerizable compound described below as the polymerizable compound.

In the present invention, the phrase "liquid crystal molecules are substantially vertically aligned" means that the director of the vertically aligned liquid crystal molecules is slightly off from the vertical direction and is given a pretilt angle. When liquid crystal molecules are completely vertically aligned, an angle formed between the direction completely parallel to the substrate surfaces and the direction of the director of the liquid crystal molecules is 90°. When the liquid crystal molecules are completely homogeneously aligned (horizontally aligned with respect to the substrate surfaces), this angle is 0°. When the liquid crystal molecules are substantially vertically aligned, this angle is preferably 89.7 to 85° and more preferably 89.5 to 87°.

The liquid crystal display device of the present invention may have a polyimide alignment film, which is used for aligning the liquid crystal composition, on both or one of the first substrate and the second substrate, or on none of the substrates.

When the liquid crystal display device of the present invention has no polyimide alignment film, the liquid crystal display device may have a structure in which the liquid crystal composition is aligned by using a polymer of a polymerizable compound having a reactive group for aligning the liquid crystal composition. Even when the liquid crystal display device has a polyimide alignment film, the liquid crystal display device may have a structure in which the liquid crystal composition is aligned by using a polymer of a polymerizable compound having a reactive group for supplementally aligning the liquid crystal composition in a direction different from the alignment direction of the polyimide.

The polymerizable compound having a reactive group for forming an alignment control layer of the liquid crystal display device of the present invention is preferably a polymerizable compound represented by general formula (ii):

[Chem. 1]

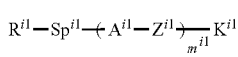

(ii)

(In the formula,
$Z^{i1}$ represents a single bond, —CH=CH—, —CF=CF—, —C≡C—, —COO—, —OCO—, —CF$_2$O—, —OCF$_2$—, or an alkylene group having 2 to 20 carbon atoms in which one —CH$_2$— or two or more non-adjacent —CH$_2$— in the alkylene group may each be substituted with —O—, —COO—, or —OCO—,
$A^{i1}$ represents a divalent six-membered ring aromatic group, a divalent six-membered ring heteroaromatic group, a divalent six-membered ring aliphatic group, a divalent six-membered ring heteroaliphatic group, or a single bond, in which hydrogen atoms in these cyclic structures may be substituted with a halogen atom and/or -Sp$^{i1}$-R$^{i1}$,
when there are more than one Z and Al, they may be the same or different,
$m^{i1}$ represents an integer of 1 to 5,
$K^{i1}$ represents a hydroxy group, an amino group, -Sp$^{i1}$-R$^{i1}$, or
a structure represented by any of
formula (K-1) to formula (K-8) below:

[Chem. 2]

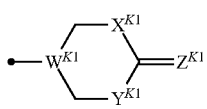

(K-1)

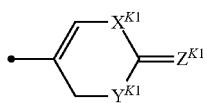

(K-2)

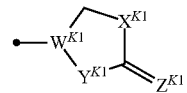

(K-3)

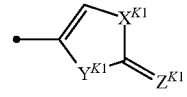

(K-4)

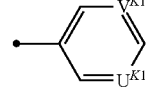

(K-5)

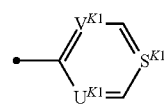

(K-6)

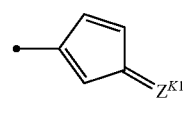

(K-7)

(K-8)

(In the formulae,
$W^{K1}$ represents a methine group or a nitrogen atom,
$X^{K1}$ and $Y^{K1}$ each independently represent —CH$_2$—, an oxygen atom, or a sulfur atom,
$Z^{K1}$ represents an oxygen atom or a sulfur atom, and
$U^{K1}$, $V^{K1}$, and $S^{K1}$ each independently represent a methine group or a nitrogen atom but the combination of [$U^{K1}$ representing a methine group, VK representing a methine group, and SK representing a nitrogen atom] is excluded.)

In formulae (i) and (K-1) to (K-8), the black dot on the left end represents an atomic bond, Sp$^{i1}$ represents a linear alkylene group having 1 to 18 carbon atoms, a branched alkylene group having 1 to 18 carbon atoms, or a single bond, wherein one —CH$_2$— or two or more non-adjacent —CH$_2$— in the alkylene group may each be substituted with —O—, —COO—, or —OCO—, and R$^{i1}$ represents a hydrogen atom or a substituent selected from the group consisting of formulae (R-1) to (R-15):

[Chem. 3]

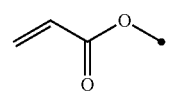

(R-1)

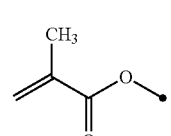

(R-2)

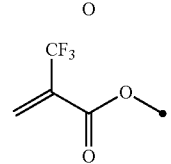

(R-3)

 (R-4)

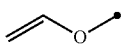 (R-5)

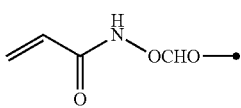 (R-6)

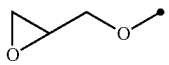 (R-7)

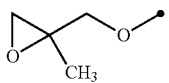 (R-8)

 (R-9)

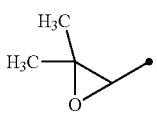 (R-10)

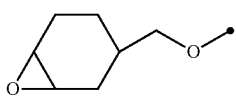 (R-11)

 (R-12)

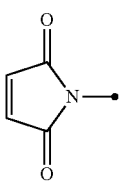 (R-13)

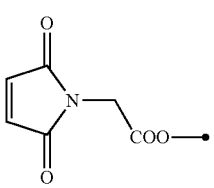 (R-14)

 (R-15)

(In the formulae, the black dot on the right end represents an atomic bond.)

Note that when the identically represented substituents are present within a molecule, they may be the same or different.)

In formulae (i) and (ii), $Z^{i1}$ preferably represents a single bond or a linear or branched alkylene group having 2 to 20 carbon atoms in which one —$CH_2$— or two or more non-adjacent —$CH_2$— in the alkylene group may each be substituted with —O—, more preferably represents a single bond or a linear alkylene group having 2 to 15 carbon atoms in which one —$CH_2$— or two or more non-adjacent —$CH_2$— in the alkylene group may each be substituted with —O—, and yet more preferably represents a single bond, an alkylene group having 2 carbon atoms (ethylene group (—$CH_2CH_2$—)) in which one —$CH_2$— in the ethylene group may be substituted with —O—(—CH—O— or —$OCH_2$—), or a linear alkylene group having 3 to 13 carbon atoms in which one —$CH_2$— or two or more non-adjacent —$CH_2$— in the alkylene group may each be substituted with —O—.

$A^{i1}$ preferably represents a divalent six-membered ring aromatic group or a divalent six-membered ring aliphatic group (any hydrogen atom in these cyclic structures may be substituted with a halogen atom), more preferably represents an unsubstituted divalent six-membered ring aromatic group, an unsubstituted divalent six-membered ring aliphatic group, or a group in which any hydrogen atom in the aforementioned cyclic structure is substituted with a fluorine atom, and yet more preferably represents a divalent unsubstituted six-membered ring aromatic group or a group in which any hydrogen atom in the aforementioned cyclic structure is substituted with a fluorine atom, or an unsubstituted divalent six-membered ring aliphatic group.

$m^{i1}$ preferably represents an integer of 1 to 4 and more preferably represents an integer of 1 to 3.

$K^{i1}$ preferably represents a structure represented by any of formulae (K-1) to (K-5) and (K-8) and more preferably represents a structure represented by any of formulae (K-1), (K-5), and (K-8).

In formulae (K-1) to (K-8), $W^{K1}$ preferably represents a methine group. $X^{K1}$ and $Y^{K1}$ preferably each independently represent —$CH_2$— or an oxygen atom. $Z^{K1}$ preferably represents an oxygen atom. One or both of $U^{K1}$ and $V^{K1}$ preferably represent nitrogen atoms, and one of $U^{K1}$ and $V^{K1}$ more preferably represents a methine group while the other represents a nitrogen atom. $S^{K1}$ preferably represents a nitrogen atom.

In formula (ii), $Sp^{i1}$ preferably represents a linear alkylene group having 1 to 18 carbon atoms or a single bond, more preferably represents a linear alkylene group having 2 to 15 carbon atoms or a single bond, and yet more preferably represents a linear alkylene group having 3 to 12 carbon atoms or a single bond.

$R^{i1}$ preferably represents a hydrogen atom or a substituent represented by formula (R-1) or (R-2).

As general formula (ii), a polymerizable compound represented by general formula (V) is preferable:

[Chem. 4]

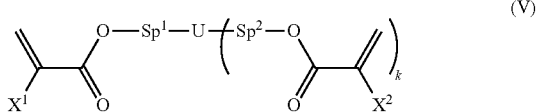 (V)

(In the formula, $X^1$ and $X^2$ each independently represent a hydrogen atom or a methyl group, $Sp^1$ and $Sp^2$ each independently represent a single bond, an alkylene group having 1 to 8 carbon atoms, or —O—$(CH_2)_s$— (In the formula, s represents an integer of 2 to 7, and the oxygen atom is bonded to an aromatic ring), U represents a linear or branched alkylene group having 2 to 20 carbon atoms or a polyvalent cyclic substituent having 5 to 30 carbon atoms, wherein alkylene groups in the polyvalent alkylene group may be substituted with oxygen atoms as long as the oxygen atoms are not adjacent to each other, or with alkyl groups having 5 to 20 carbon atoms (the alkylene group in the group may be substituted with an oxygen atom as long as the oxygen atoms are not adjacent to each other) or cyclic substituents, and k represents an integer of 1 to 5.).

In general formula (V) above, $X^1$ and $X^2$ each independently represent a hydrogen atom or a methyl group; however, when the reaction speed is important, a hydrogen atom is preferable, and when decreasing the amount of reaction residues is important, a methyl group is preferable.

In general formula (V) above, $Sp^1$ and $Sp^2$ each independently represent a single bond, an alkylene group having 1 to 8 carbon atoms, or —O—$(CH_2)_s$— (in the formula, s represents an integer of 2 to 7, and the oxygen atom is bonded to an aromatic ring); however, the carbon chain is preferably not excessively long, a single bond or an alkylene group having 1 to 5 carbon atoms is preferable, and a single bond or an alkylene group having 1 to 3 carbon atoms is more preferable. When $Sp^1$ and $Sp^2$ each represent —O—$(CH_2)_s$—, s is preferably 1 to 5 and more preferably 1 to 3. Preferably, at least one of $Sp^1$ and $Sp^2$ is a single bond, and particularly preferably both are single bonds.

In general formula (V) above, U represents a linear or branched polyvalent alkylene group having 2 to 20 carbon atoms or a polyvalent cyclic substituent having 5 to 30 carbon atoms, wherein alkylene groups in the polyvalent alkylene group may be substituted with oxygen atoms as long as the oxygen atoms are not adjacent to each other, or with alkyl groups having 5 to 20 carbon atoms (the alkylene group in the group may be substituted with an oxygen atom as long as the oxygen atoms are not adjacent to each other) or cyclic substituents, and are preferably substituted with two or more cyclic substituents.

In general formula (V) above, specifically, U preferably represents one of formulae (Va-1) to (Va-5) below, more preferably represents one of formulae (Va-1) to (Va-3), and particularly preferably represents formula (Va-1).

[Chem. 5]

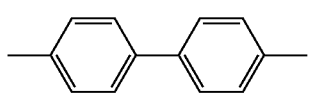
(Va-1)

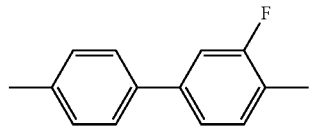
(Va-2)

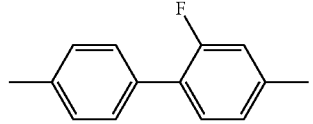
(Va-3)

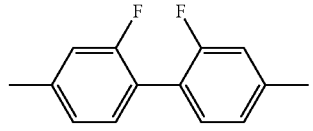
(Va-4)

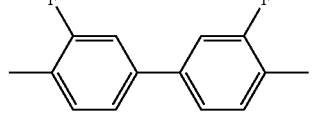
(Va-5)

(In the formulae, two ends are bonded to $Sp^1$ or $Sp^2$.)

When U has a cyclic structure, at least one or both of $Sp^1$ and $Sp^2$ preferably represent a single bond.

In general formula (V) above, k represents an integer of 1 to 5; however, a difunctional compound with k representing 1 or a trifunctional compound with k representing 2 is preferable, and a difunctional compound is more preferable.

The compound represented by general formula (V) above is specifically preferably a compound represented by general formula (Vb) below.

[Chem. 6]

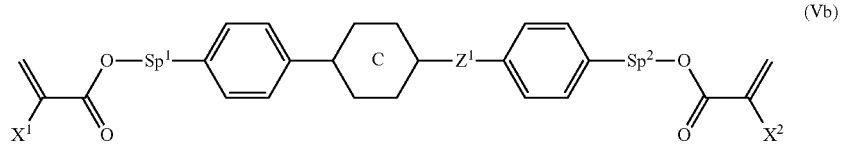
(Vb)

(In the formula, $X^1$ and $X_2$ each independently represent a hydrogen atom or a methyl group, $Sp^1$ and $Sp^2$ each independently represent a single bond, an alkylene group having 1 to 8 carbon atoms, or —O—$(CH_2)_s$— (in the formula, s represents an integer of 2 to 7, and the oxygen atom is bonded to the aromatic ring), $Z^1$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$—, —C≡C—, or a single bond, C represents a 1,4-phenylene group, a trans-1,4-cyclohexylene group, or a single bond, and all 1,4-phenylene groups in the formula may have any hydrogen atom substituted with a fluorine atom.)

In general formula (Vb) above, $X^1$ and $X^2$ each independently represent a hydrogen atom or a methyl group; however, a diacrylate derivative with both $X^1$ and $X^2$ representing a hydrogen atom or a dimethacrylate derivative with both $X^1$ and $X^2$ representing a methyl group is preferable, and a compound in which one of $X^1$ and $X^2$ represents a hydrogen atom and the other represents a methyl group is also preferable. As for the polymerization rates of these compounds, that of the diacrylate derivative is the highest, that of the dimethacrylate derivative is low, and that of the asymmetric compound is intermediate; a preferable form can be selected depending on the usage. For a PSA liquid crystal display device, a dimethacrylate derivative is particularly preferable.

In general formula (Vb) above, $Sp^1$ and $Sp^2$ each independently represent a single bond, an alkylene group having 1 to 8 carbon atoms, or —O—$(CH_2)s$—; however, in a PSA liquid crystal display device, at least one of them is preferably a single bond, and a compound in which both represent single bonds, or in which one represents a single bond and the other represents an alkylene group having 1 to 8 carbon atoms or —O—$(CH_2)s$— is preferable. In such a case, an alkylene group having 1 to 4 carbon atoms is preferable, and s is preferably 1 to 4.

In general formula (Vb) above, $Z^1$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$—, —C≡C—, or a single bond, but preferably represents —$OCH_2$—, —$CH_2O$—, —COO—, —OCO—, —$CF_2O$—, —$OCF_2$—, —$CH_2CH_2$—, —$CF_2CF_2$—, or a single bond, more preferably represents —COO—, —OCO—, or a single bond, and particularly preferably represents a single bond.

In general formula (Vb) above, C represents a 1,4-phenylene group in which any hydrogen atom may be substituted with a fluorine atom, a trans-1,4-cyclohexylene group, or a single bond, but preferably represents a 1,4-phenylene group or a single bond.

When C represents a cyclic structure other than a single bond, $Z^1$ preferably represents a linking group other than a single bond; and when C represents a single bond, $Z^1$ preferably represents a single bond.

As described above, in general formula (Vb) above, The case in which C represents a single bond and a cyclic structure is formed of two rings is preferable; and, specifically, as the polymerizable compound having a cyclic structure, compounds represented by general formulae (V-1) to (V-6) below are preferable, compounds represented by general formulae (V-1) to (V-4) are particularly preferable, and compounds represented by general formula (V-2) are most preferable.

[Chem. 7]

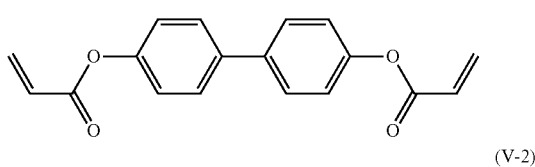

(V-1)

(V-2)

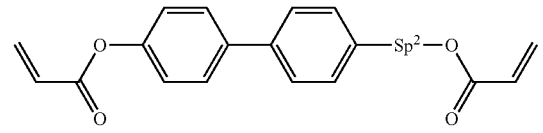

(V-3)

(V-4)

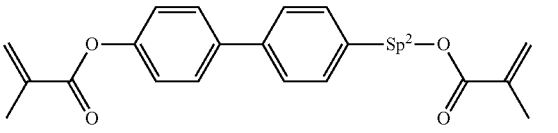

(V-5)

(V-6)

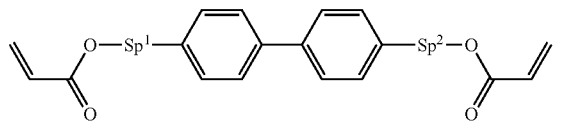

An alignment control layer is formed by preparing and using a liquid crystal-containing polymerization composition that contains a liquid crystal composition and a compound represented by general formula (V). A specific method for forming an alignment control layer is described in a later section, "Method for producing liquid crystal display device".

The liquid crystal-containing polmerization composition contains a compound represented by general formula (V) and can contain other additional polymerizable compounds. Examples thereof include trifunctional or higher (meth) acrylate compounds, difunctional (meth)acrylate compounds, and monofunctional (meth)acrylate compounds.

The compound represented by general formula (V) is preferably contained in an amount of 0.1 to 15 mass %, more preferably in an amount of 0.1 to 10 mass %, and yet more preferably in an amount of 0.1 to 8 mass % relative to the liquid crystal-containing polymerization composition.

The liquid crystal display device 10 may further include a passivation film between the first substrate 11 and the liquid crystal layer 13 and/or between the second substrate 12 and the liquid crystal layer 13 (not illustrated). When there is a passivation film, the surface of the first substrate 11 or the second substrate 12 near the passivation film is protected.

The liquid crystal display device 10 may further include a planarizing film between the first substrate 11 and the liquid crystal layer 13 and/or between the second substrate 12 and the liquid crystal layer 13 (not illustrated). When the flatness of the surface is high, such a passivation film may be treated as a planarizing film.

Known appropriate films can be used as the passivation film and the planarizing film.

The liquid crystal display device of the present invention uses a combination of a liquid crystal composition that uses particular compounds described below in combination as the liquid crystal molecules and an alignment control layer formed of a particular polymerizable compound; thus, unlike liquid crystal display devices of related art, regardless of whether an alignment film is provided between the first substrate and the liquid crystal layer and between the second substrate and the liquid crystal layer or not, liquid crystal molecules substantially vertically align with respect to the substrate surface in the absence of an applied voltage. Moreover, image-sticking is suppressed without degrading various properties such as dielectric anisotropy, viscosity, nematic phase upper limit temperature, and rotational viscosity ($\gamma_1$).

Figure 4:
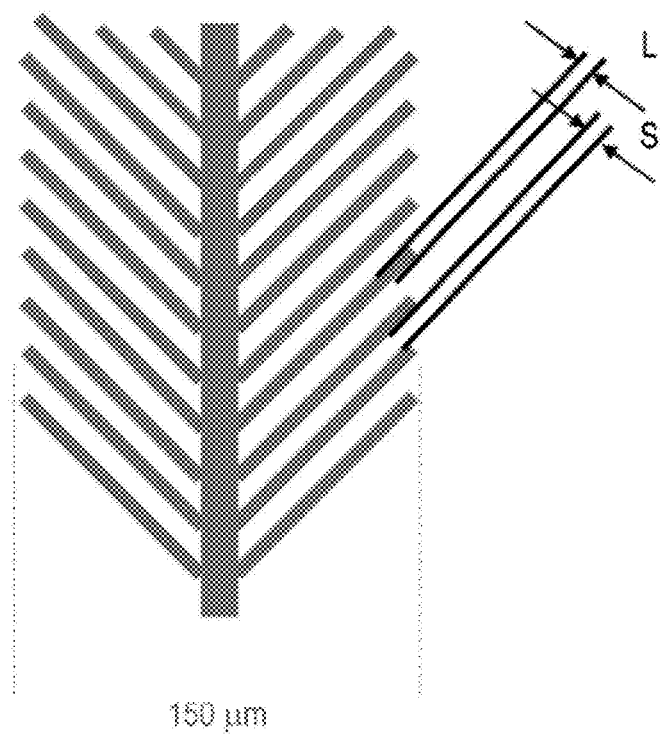
FIG. 4 is one example of a plan view of an electrode pattern on one substrate used in a preferable liquid crystal display device of the present invention.
Figure 5:
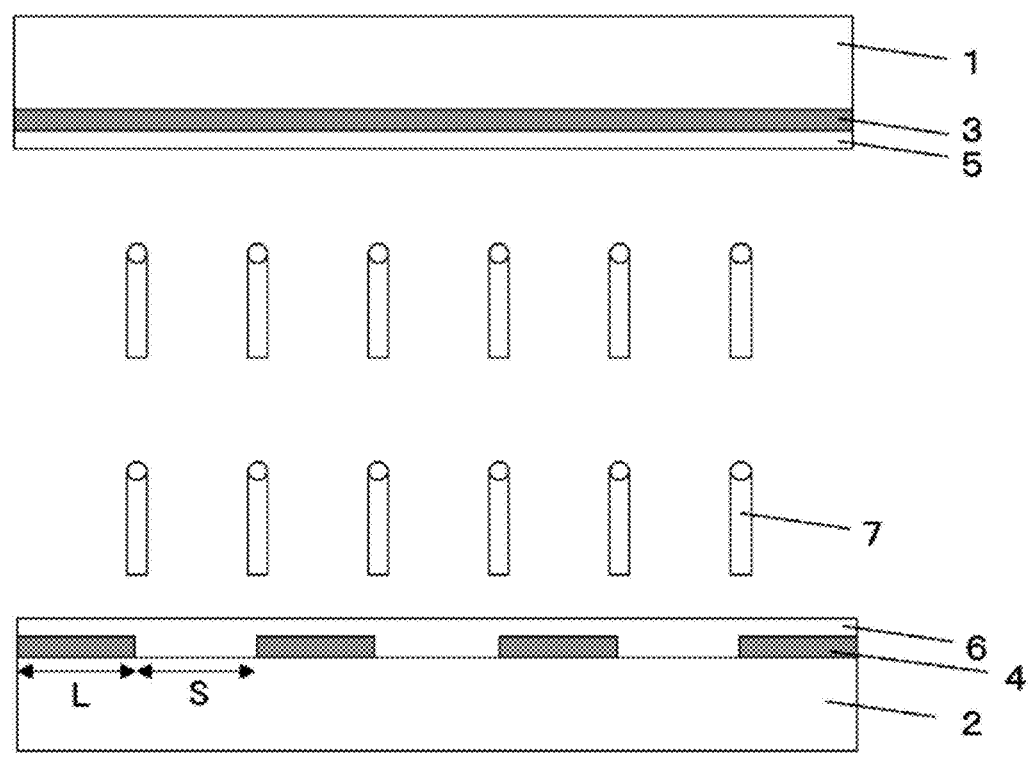
FIG. 5 is one example of a cross-sectional view of a preferable liquid crystal display device of the present invention that uses the electrode illustrated in FIG. 4, and is a conceptual diagram of alignment of a liquid crystal compound when no voltage is applied between the electrodes.

FIG. 4 illustrates one part of FIG. 2. The electrode A of the present invention has a fishbone pattern having a branched portion, and a space (S μm) between adjacent branches of branches of the fishbone pattern and an inter-substrate distance (d μm) between the first substrate and the second substrate satisfy a relationship of formula (1):

$$(d-0.6)/1.25 < S < (d+1.1)/1.25 \quad \text{formula (1)}$$

Here, when S=(d−α)/1.25, the upper limit of a is 0.6, preferably 0.5, preferably 0.4, preferably 0.3, preferably 0.2, preferably 0.1, and preferably 0. The lower limit is preferably −1.1, preferably −1.06, preferably −1.03, preferably −1.00, preferably −0.97, preferably −0.93, preferably −0.9, preferably −0.87, preferably −0.83, preferably −0.8, preferably −0.77, preferably −0.73, preferably −0.7, preferably −0.67, preferably −0.63, preferably −0.6, preferably −0.57, preferably −0.53, preferably −0.5, preferably −0.47, preferably −0.43, and preferably −0.4.

Optimizing α can improve the transmittance of the liquid crystal display device. Deviation of S from the range specified by the present invention is not preferable from the viewpoint of transmittance, and deviation of d from the range specified by the present invention is not preferable from the viewpoints of transmittance and response speed. S is preferably in the range of 1 to 4 and is preferably in the range of 1.5 to 3.3. d is preferably in the range of 0.7 to 3.6, preferably in the range of 1.0 to 3.6, and preferably in the range of 1.5 to 3.6. d is never smaller than 0.6.

The transmittance (T) is preferably high from the standpoint of the properties of the liquid crystal display device; however, from the standpoint of human visual properties, the transmittance (T) is preferably 0.26 or more, preferably 0.27 or more, preferably 0.28 or more, preferably 0.29 or more, and preferably 0.30 or more. In particular, for use in liquid crystal televisions and the like, the transmittance is preferably 0.28 or more.

The cause of degradation of the contrast resulting from degradation of the transmittance caused by narrowing the cell gap is considered to be complex. However, the cause may be that the equipotential plane generated by applying a voltage between electrodes becomes more complicated due to the narrow cell gap and thus becomes more susceptible to the influence of the electrode width and electrode spaces, and that due to the influence of Δn of the liquid crystal composition, K11, K33, and the like, the alignment state of the liquid crystal composition in the inter-substrate direction is strongly affected. Thus, it becomes necessary that S and d satisfy a particular relationship. Moreover, since the liquid crystal composition is required to have various physical properties, liquid crystal compounds that constitute the liquid crystal composition are preferably a particular combination.

<Method for Producing Liquid Crystal Display Device>

The liquid crystal display device 10 illustrated in FIG. 1 can be produced by, for example, the following method.

First, the first substrate 11 and the second substrate 12 are stacked on top of each other, and a liquid crystal-containing polymerization composition for forming a liquid crystal layer 13 and an alignment control layer in the step described below is sandwiched between the substrates. The aforementioned liquid crystal-containing polymerization composition contains, as an essential component, a compound represented by general formula (1) above relative to the liquid crystal composition, but preferably contains, as the compounds constituting the liquid crystal composition, a compound represented by general formula (I) and a compound represented by general formula (II) above.

More specifically, spacer projections, for example, plastic beads or the like, for securing the cell gap are scattered onto an opposing surface of one of the first substrate 11 and the second substrate 12, and, for example, a seal portion is printed (formed) by a screen printing method using an epoxy adhesive or the like. Note that the surface of the first substrate 11 that opposes the second substrate 12 is a surface that has the common electrode 14 and the color filter 18, and the surface of the second substrate 12 that opposes the first substrate 11 is a surface that has the pixel electrode 15.

Next, the first substrate 11 and the second substrate 12 are arranged to oppose each other and bonded with each other with the spacer projections and the seal portion therebetween, and then the liquid crystal-containing polymerization composition is injected into the space formed thereby. The seal portion is then cured by heating or the like so as to sandwich the liquid crystal-containing polymerization composition between the first substrate 11 and the second substrate 12.

Figure 3:
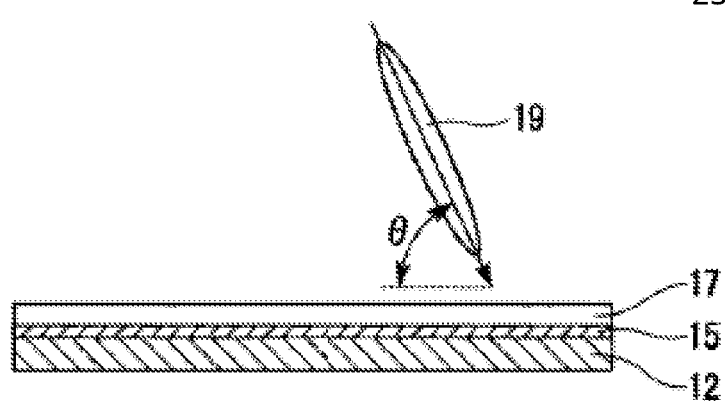
FIG. 3 is a diagram illustrating a definition of a pretilt angle in one domain in the liquid crystal display device of the present invention.

Next, a voltage is applied between the common electrode 14 and the pixel electrode 15 by using a voltage applying means. The voltage is, for example, 5 to 30 V. In this manner, an electric field that forms a particular angle with respect to the surface of the first substrate 11 adjacent to the liquid crystal-containing polymerization composition (the surface opposing the liquid crystal-containing polymerization composition) and the surface of the second substrate 12 adjacent to the liquid crystal-containing polymerization composition (the surface opposing the liquid crystal-containing polymerization composition) is formed, liquid crystal molecules (the compound represented by general formula (I) and the compound represented by general formula (II)) 19 in the liquid crystal-containing polymerization composition tilt and align in a particular direction from a direction normal to the first substrate 11 and the second substrate 12, and, as illustrated in FIG. 3, a pretilt angle θ is imparted to the liquid crystal molecules 19. The magnitude of the pretilt angle 9 can be controlled by appropriately adjusting the magnitude of the voltage.

Next, while the voltage is still applied, an active energy ray such as an ultraviolet ray is radiated onto the liquid crystal-containing polymerization composition from the outer side of the first substrate 11 so as to polymerize the aforementioned two or more polymerizable compounds. The active energy ray may be radiated from the outer side of the second substrate 12, or from the outer side of the first substrate 11 and the outer side of the second substrate 12.

Radiating the active energy ray causes the two or more polymerizable compounds in the liquid crystal-containing polymerization composition to react with one another, and the liquid crystal-containing polymerization composition turns into a liquid crystal composition having a desired composition and forms a liquid crystal layer 13. At the same time, alignment control layers are formed between the first substrate 11 and the liquid crystal layer 13 and between the second substrate 12 and the liquid crystal layer 13.

The alignment control layer thus formed imparts a pretilt angle θ to the liquid crystal molecules 19 near the first substrate 11 and the second substrate 12 in the liquid crystal layer 13 in a non-driven state.

The active energy ray irradiation intensity may or may not be constant. When the irradiation intensity is varied, the irradiation time at each irradiation intensity may be set as desired; however, when an irradiating step that involves two or more stages is employed, the irradiation intensity of the irradiation step of the second stage and onward is preferably weaker than the irradiation intensity of the first stage of the irradiation step, and the second stage and onward of the irradiation step are preferably performed for a total irradiation time longer than the irradiation time of the first stage and preferably involve a larger total irradiation energy amount. When the irradiation intensity is varied discontinuously, the average irradiation light intensity in the first half of the total irradiation step time is preferably stronger than the average irradiation intensity of the second half, more preferably, the intensity immediately after start of irradiation is the strongest, and yet more preferably, the irradiation intensity constantly keeps decreasing to a particular value with passage of the irradiation time. In such a case, the irradiation intensity of the active energy ray is preferably 2 to 100 mW/cm$^2$; more preferably, in the first stage of the multistage irradiation or when the irradiation intensity is varied discontinuously, the maximum irradiation intensity in the entire irradiation step is preferably 10 to 100 mW/cm$^2$, and in the second or onward stage of the multilayer irradiation or when the irradiation intensity is varied discontinuously, the minimum irradiation intensity is more preferably 2 to 50 mW/cm$^2$. The total irradiation energy is preferably 10 to 300 J, more preferably 50 to 250 J, and yet more preferably 100 to 250 J.

The applied voltage may be AC or DC.

The active energy ray to be radiated preferably has multiple spectra, and an ultraviolet ray having multiple spectra is preferable. By radiating an active energy ray having multiple spectra, the two or more polymerizable compounds can be polymerized by using an active energy ray having spectra (wavelengths) suitable for the types of the polymerizable compounds, and, in such a case, the alignment control layer is more effectively formed.

The alignment control layer is constituted by a polymer of the polymerizable compounds but is not limited to the layer that clearly defines and is formed between the first substrate 11 and the liquid crystal layer 13. It is assumed that there may be cases in which, in the vicinity of the first substrate 11, the alignment control layer is formed so as to penetrate into the inside of the liquid crystal layer 13 from the surface of the first substrate 11 adjacent to the liquid crystal layer 13 (the surface opposing the liquid crystal layer 13). The same may occur in the vicinity of the second substrate 12. That is, the alignment control layer is not limited to the layer that clearly defines and is formed between the second substrate 12 and the liquid crystal layer 13. It is assumed that there may be cases in which, in the vicinity of the second substrate 12, the alignment control layer is formed so as to penetrate into the inside of the liquid crystal layer 13 from the surface of the second substrate 12 adjacent to the liquid crystal layer 13 (the surface opposing the liquid crystal layer 13).

However, it is difficult to accurately describe the structure of the alignment control layer.

Moreover, it is assumed that the active energy ray irradiation causes preferential polymerization between like structures in the aforementioned two or more polymerizable compounds so that the liquid crystal molecules align in the region near the substrate, and that the pretilt direction is thus regulated in a particular direction to control the alignment.

(Liquid Crystal Composition)

The liquid crystal composition of the present invention contains one or more of compounds represented by general formulae (N-1), (N-2), and (N-3).

[Chem. 8]

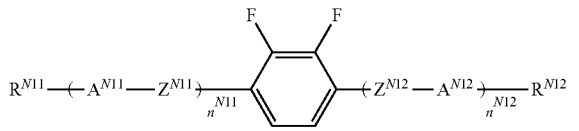

(N-1)

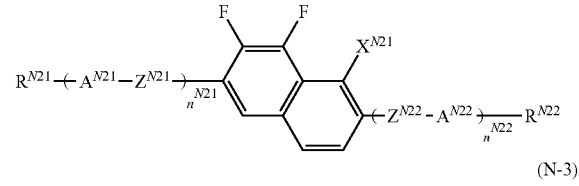

(N-2)

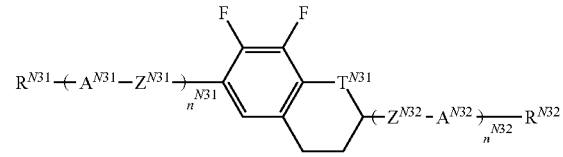

(N-3)

In the formulae, $R^{N11}$, $R^{N12}$, $R^{N21}$, $R^{N22}$, $R^{N31}$, and $R^{N32}$ each independently represent an alkyl group having 1 to 8 carbon atoms, in which one —$CH_2$— or two or more non-adjacent —$CH_2$— in the alkyl group may each independently be substituted with —CH=CH—, —C≡C—, —O—, —CO—, —COO—, or —OCO—, $A^{N11}$, $A^{N12}$, $A^{N21}$, $A^{N22}$, $A^{N31}$, and $A^{N32}$ each independently represent a group selected from the group consisting of:

(a) a 1,4-cyclohexylene group (one —$CH_2$— or two or more non-adjacent —$CH_2$— present in this group may each be substituted with —O—), and (b) a 1,4-phenylene group (one —CH= or two or more non-adjacent —CH=present in this group may each be substituted with —N=), (c) a naphthalene-2,6-diyl group, a 1,2,3,4-tetrahydronaphthalene-2,6-diyl group, or a decahydronaphthalene-2,6-diyl group (one —CH= or two or more non-adjacent —CH=present in the naphthalene-2,6-diyl group or the 1,2,3,4-tetrahydronaphthalene-2,6-diyl group may each be substituted with —N=), and the groups (a), (b), and (c) described above may each independently be substituted with a cyano group, a fluorine atom, or a chlorine atom, $Z^{N11}$, $Z^{N12}$, $Z^{N21}$, $Z^{N22}$, $Z^{N31}$, and $Z^{N32}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —(CH=CH—, —CF=CF—, or —C≡C—, $X^{N21}$ represents a hydrogen atom or a fluorine atom, $T^{N31}$ represents —$CH_2$— or —O—, and $n^{N11}$, $n^{N12}$, $n^{N21}$, $n^{N22}$, $n^{N31}$, and $n^{N32}$ each independently represent an integer of 0 to 3 but $n^{N11}+n^{N12}$, $n^{N21}+n^{N22}$, and $n^{N31}+n^{N32}$ are each independently 1, 2, or 3, and when there are more than one $A^{N11}$ to $A^{N32}$ and $Z^{N11}$ to $Z^{N32}$, they may the same or different.

The compounds represented by general formulae (N-1), (N-2), and (N-3) are each preferably a compound having a negative Δε having an absolute value larger than 3.

In general formulae (N-1), (N-2), and (N-3), $R^{N11}$, $R^{N12}$, $R^{N21}$, $R^{N22}$, $R^{N31}$, and $R^{N32}$ preferably each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably each independently represent an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably each independently represent an alkyl group having 1 to 5 carbon atoms or an alkenyl group having 2 to 5 carbon atoms, more preferably each independently represent an alkyl group having 2 to 5 carbon atoms or an alkenyl group having 2 or 3 carbon atoms, and particularly preferably each independently represent an alkenyl group having 3 carbon atoms (propenyl group).

When the cyclic structure that the group bonds to is a phenyl group (an aromatic), a linear alkyl group having 1 to 5 carbon atoms, a linear alkoxy group having 1 to 4 carbon atoms, and an alkenyl group having 4 or 5 carbon atoms are preferable; and when the cyclic structure that the group bonds to is a saturated cyclic structure, such as cyclohexane, pyran, and dioxane, a linear alkyl group having 1 to 5 carbon atoms, a linear alkoxy group having 1 to 4 carbon atoms, and a linear alkenyl group having 2 to 5 carbon atoms are preferable. In order to stabilize the nematic phase, the total number of carbon atoms and, if any, oxygen atoms is preferably 5 or less, and the structure is preferably linear.

The alkenyl group is preferably the one selected from the groups represented by formulae (R1) to (R5). (In each of the formulae, the black dot represents a carbon atom in the cyclic structure.)

[Chem. 9]

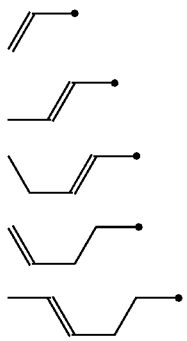

(R1)
(R2)
(R3)
(R4)
(R5)

$A^{N11}$, $A^{N12}$, $A^{N21}$, $A^{N22}$, $A^{N31}$, and $A^{N32}$ are preferably each independently an aromatic when increasing Δn is required, or an aliphatic when improving the response speed is required, and preferably each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably each independently represent the following structure:

[Chem. 10]

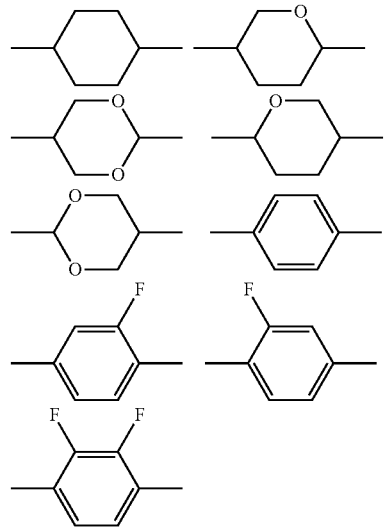

and yet more preferably each independently represent a trans-1,4-cyclohexylene group or a 1,4-phenylene group.

$Z^{N11}$, $Z^{N12}$, $Z^{N21}$, $Z^{N22}$, $Z^{N31}$, and $Z^{N32}$ preferably each independently represent —$CH_2O$—, —$CF_2O$—, —$CH_2CH_2$—, —$CF_2CF_2$—, or a single bond, more preferably each independently represent —$CH_2O$—, —$CH_2CH_2$—, or a single bond, and yet more preferably each independently represent —$CH_2O$— or a single bond.

$X^{N21}$ preferably represents a fluorine atom.

$T^{N31}$ preferably represents —O—.

$n^{N11}+n^{N12}$, $n^{N21}+n^{N22}$, and $n^{N31}+n^{N32}$ are each preferably 1 or 2, and preferred are the combination in which $n^{N11}$ is 1 and $n^{N12}$ is 0, the combination in which $n^{N11}$ is 2 and $n^{N12}$ is 0, the combination in which $n^{N11}$ is 1 and $n^{N12}$ is 1, the combination in which null is 2 and $n^{N12}$ is 1, the combination in which $n^{N21}$ is 1 and $n^{N22}$ is 0, the combination in which $n^{N21}$ is 2 and $n^{N22}$ is 0, the combination in which $n^{N31}$ is 1 and $n^{N32}$ is 0, and the combination in which $n^{N31}$ is 2 and $n^{N32}$ is 0.

The lower limit of the preferable content of the compound represented by general formula (N-1) relative to the total amount of the liquid crystal composition of the present invention (the total amount of the liquid crystal compounds contained in the liquid crystal composition, the same applies hereinafter) is 1 mass % (hereinafter, mass % is simply referred to as %), 10%, 20%, 30%, 40%, 50%, 55%, 60%, 65%, 70%, 75%, or 80%. The upper limit of the preferable content is 95%, 85%, 75%, 65%, 55%, 45%, 35%, 25%, or 20%.

The lower limit of the preferable content of the compound represented by general formula (N-2) relative to the total amount of the liquid crystal composition of the present invention is 1 mass % (hereinafter, mass % is simply referred to as %), 10%, 20%, 30%, 40%, 50%, 55%, 60%, 65%, 70%, 75%, or 80%. The upper limit of the preferable content is 95%, 85%, 75%, 65%, 55%, 45%, 35%, 25%, or 20%.

The lower limit of the preferable content of the compound represented by general formula (N-3) relative to the total amount of the liquid crystal composition of the present invention is 1 mass % (hereinafter, mass % is simply referred to as %), 10%, 20%, 30%, 40%, 50%, 55%, 60%, 65%, 70%, 75%, or 80%. The upper limit of the preferable content is 95%, 85%, 75%, 65%, 55%, 45%, 35%, 25%, or 20%.

In order to keep the viscosity of the liquid crystal composition of the present invention low and when a composition having high response speed is necessary, the aforementioned lower limit is preferably low and the upper limit is preferably low. Furthermore, in order to keep Tni of the composition of the present invention high and when a composition having good temperature stability is necessary, the aforementioned lower limit is preferably low and the upper limit is preferably low. Moreover, when it is desirable to increase the dielectric anisotropy to keep low driving voltage, the aforementioned lower limit is preferably high and the upper limit is preferably high.

The compound represented by general formula (N-1) is preferably a compound selected from the group of compounds represented by general formulae (N-1-1) to (N-1-21).

Compounds represented by general formula (N-1-1) are as follows.

[Chem. 11]

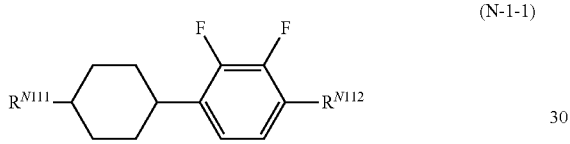

(N-1-1)

(In the formula, $R^{N111}$ and $R^{N112}$ are each independently the same as $R^{N11}$ and $R^{N12}$ in general formula (N-1).)

$R^{N111}$ preferably represents an alkyl group having 1 to 5 carbon atoms or an alkenyl group having 2 to 5 carbon atoms, and preferably represents a propyl group or a pentyl group. $R^{N112}$ preferably represents an alkyl group having 1 to 5 carbon atoms, an alkenyl group having 4 or 5 carbon atoms, or an alkoxy group having 1 to 4 carbon atoms, and preferably represents an ethoxy group or a butoxy group.

The compounds represented by general formula (N-1-1) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

When improving Δε is important, the content is preferably set to a relatively high level. When solubility at low temperatures is important, it is highly effective to set the content to a relatively high level. When $T_N$ is important, it is highly effective to set the content to a relatively low level. In order to improve drop marks and image-sticking properties, the content range is preferably set to an intermediate level.

The lower limit of the preferable content of the compound represented by formula (N-1-1) relative to the total amount of the liquid crystal composition of the present invention is 5 mass % (hereinafter, mass % is simply referred to as %), 10%, 13%, 15%, 17%, 20%, 23%, 25%, 27%, 30%, 33%, or 35%. The upper limit of the preferable content relative to the total amount of the liquid crystal composition of the present invention is 50%, 40%, 38%, 35%, 33%, 30%, 28%, 25%, 23%, 20%, 18%, 15%, 13%, 10%, 8%, 7%, 6%, 5%, or 3%.

Furthermore, the compounds represented by general formula (N-1-1) are preferably compounds selected from the group of compounds represented by formulae (N-1-1.1) to (N-1-1.14), are preferably compounds represented by formula (N-1-1.1) to (N-1-1.4), and are preferably compounds represented by formulae (N-1-1.1) and (N-1-1.3).

[Chem. 12]

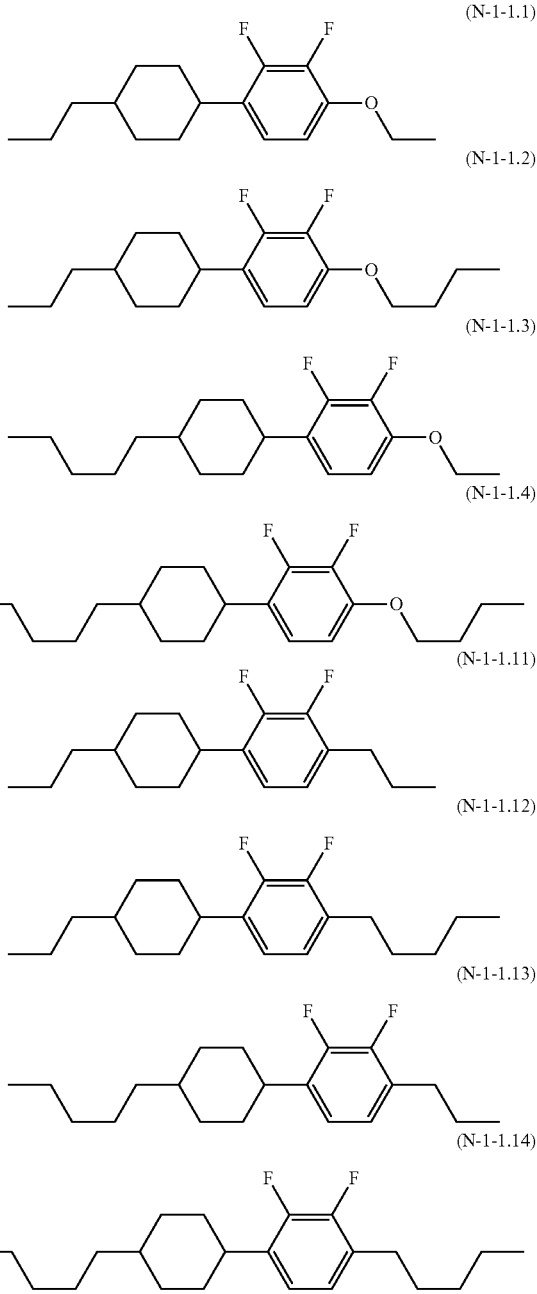

Although the compounds represented by formulae (N-1-1.1) to (N-1-1.4) can be used alone or in combination, the lower limit of the preferable content of these compounds alone or in combination relative to the total amount of the liquid crystal composition of the present invention is 5 mass % (hereinafter, mass % is simply referred to as %), 10%, 13%, 15%, 17%, 20%, 23%, 25%, 27%, 30%, 33%, or 35%.

The upper limit of the preferable content relative to the total amount of the liquid crystal composition of the present invention is 50%, 40%, 38%, 35%, 33%, 30%, 28%, 25%, 23%, 20%, 18%, 15%, 13%, 10%, 8%, 7%, 6%, 5%, or 3%.

Compounds represented by general formula (N-1-2) are as follows.

[Chem. 13]

(N-1-2)

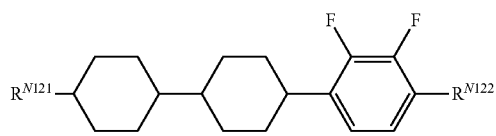

(In the formula, $R^{N121}$ and $R^{N122}$ are each independently the same as $R^{N11}$ and $R^{N12}$ in general formula (N-1).)

$R^{N121}$ preferably represents an alkyl group having 1 to 5 carbon atoms or an alkenyl group having 2 to 5 carbon atoms, and preferably represents an ethyl group, a propyl group, a butyl group, or a pentyl group. $R^{N122}$ preferably represents an alkyl group having 1 to 5 carbon atoms, an alkenyl group having 4 or 5 carbon atoms, or an alkoxy group having 1 to 4 carbon atoms, and preferably represents a methyl group, a propyl group, a methoxy group, an ethoxy group, or a propoxy group.

The compounds represented by general formula (N-1-2) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

When improving Δε is important, the content is preferably set to a relatively high level. When solubility at low temperatures is important, it is highly effective to set the content to a relatively low level. When TE is important, it is highly effective to set the content to a relatively high level. In order to improve drop marks and image-sticking properties, the content range is preferably set to an intermediate level.

The lower limit of the preferable content of the compound represented by formula (N-1-2) relative to the total amount of the liquid crystal composition of the present invention is 5 mass % (hereinafter, mass % is simply referred to as %), 7%, 10%, 13%, 15%, 17%, 20%, 23%, 25%, 27%, 30%, 33%, 35%, 37%, 40%, or 42%. The upper limit of the preferable content relative to the total amount of the liquid crystal composition of the present invention is 50%, 48%, 45%, 43%, 40%, 38%, 35%, 33%, 30%, 28%, 25%, 23%, 20%, 18%, 15%, 13%, 10%, 8%, 7%, 6%, or 5%.

Furthermore, the compounds represented by general formula (N-1-2) are preferably compounds selected from the group of compounds represented by formulae (N-1-2.1) to (N-1-2.13), are preferably compounds represented by formula (N-1-2.7), (N-1-2.10), (N-1-2.11), and (N-1-2.13), are preferably compounds represented by formulae (N-1-2.3) to (N-1-2.7) when improving Δε is important, and are preferably compounds represented by formulae (N-1-2.10), (N-1-2.11), and (N-1-2.13) when improving $T_K$ is important.

[Chem. 14]

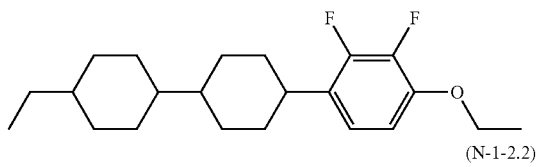

(N-1-2.1)

(N-1-2.2)

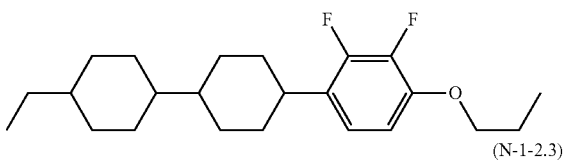

(N-1-2.3)

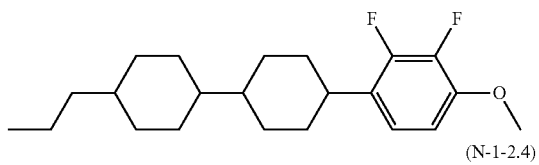

(N-1-2.4)

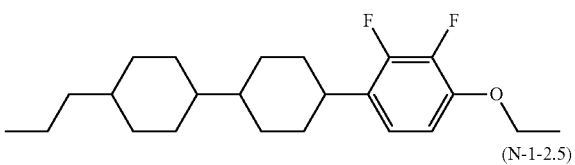

(N-1-2.5)

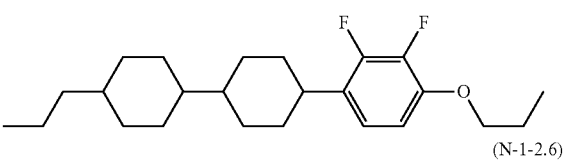

(N-1-2.6)

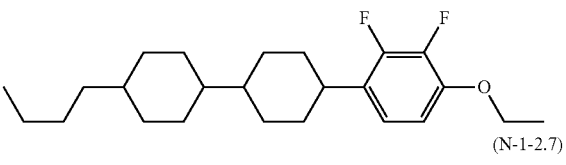

(N-1-2.7)

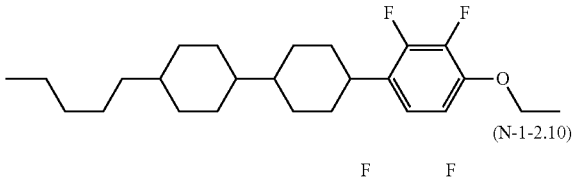

(N-1-2.10)

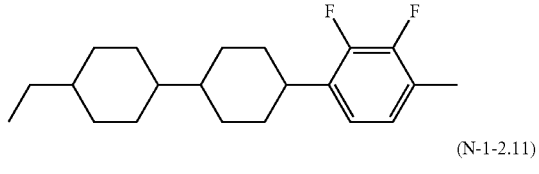

(N-1-2.11)

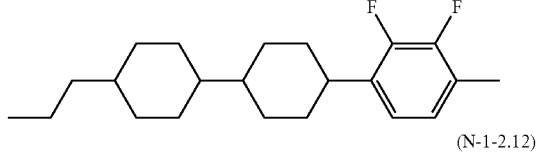

(N-1-2.12)

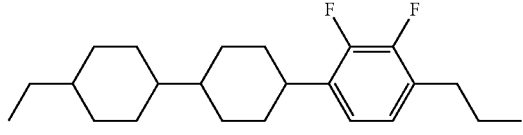

(N-1-2.13)

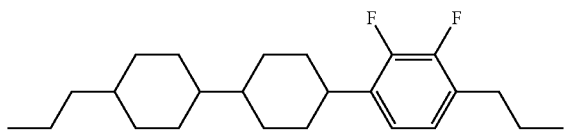

Although the compounds represented by formulae (N-1-2.1) to (N-1-2.13) can be used alone or in combination, the lower limit of the preferable content of these compounds alone or in combination relative to the total amount of the liquid crystal composition of the present invention is 5 mass % (hereinafter, mass % is simply referred to as %), 10%, 13%, 15%, 17%, 20%, 23%, 25%, 27%, 30%, 33%, or 35%. The upper limit of the preferable content relative to the total amount of the liquid crystal composition of the present invention is 50%, 40%, 38%, 35%, 33%, 30%, 28%, 25%, 23%, 20%, 18%, 15%, 13%, 10%, 8%, 7%, 6%, 5%, or 3%.

Compounds represented by general formula (N-1-3) are as follows.

[Chem. 15]

(N-1-3)

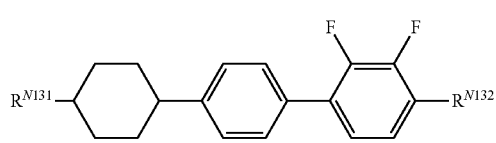

(In the formula, $R^{N131}$ and $R^{N132}$ are each independently the same as $R^{N11}$ and $R^{N12}$ in general formula (N-1).)

$R^{N131}$ preferably represents an alkyl group having 1 to 5 carbon atoms or an alkenyl group having 2 to 5 carbon atoms, and preferably represents an ethyl group, a propyl group, or a butyl group. $R^{N132}$ preferably represents an alkyl group having 1 to 5 carbon atoms, an alkenyl group having 4 or 5 carbon atoms, or an alkoxy group having 1 to 4 carbon atoms, and preferably represents an ethoxy group, a propoxy group, or a butoxy group.

The compounds represented by general formula (N-1-3) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

When improving Δε is important, the content is preferably set to a relatively high level. When solubility at low temperatures is important, it is highly effective to set the content to a relatively high level. When $T_{NI}$ is important, it is highly effective to set the content to a relatively high level. In order to improve drop marks and image-sticking properties, the content range is preferably set to an intermediate level.

The lower limit of the preferable content of the compound represented by formula (N-1-3) relative to the total amount of the liquid crystal composition of the present invention is 5 mass % (hereinafter, mass % is simply referred to as %), 10%, 13%, 15%, 17%, or 20%. The upper limit of the preferable content relative to the total amount of the composition of the present invention is 35%, 30%, 28%, 25%, 23%, 20%, 18%, 15%, or 13%.

Furthermore, the compounds represented by general formula (N-1-3) are preferably compounds selected from the group of compounds represented by formulae (N-1-3.1) to (N-1-3.11), are preferably compounds represented by formula (N-1-3.1) to (N-1-3.7), and are preferably compounds represented by formulae (N-1-3.1), (N-1-3.2), (N-1-3.3), (N-1-3.4), and (N-1-3.6).

[Chem. 16]

(N-1-3.1)

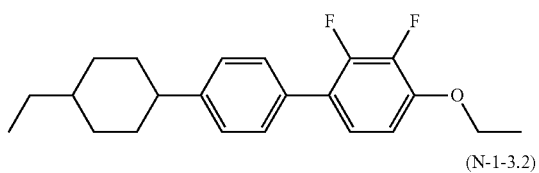

(N-1-3.2)

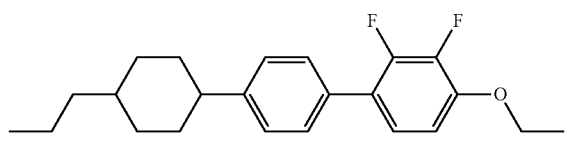

(N-1-3.3)

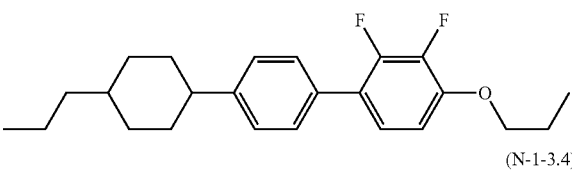

(N-1-3.4)

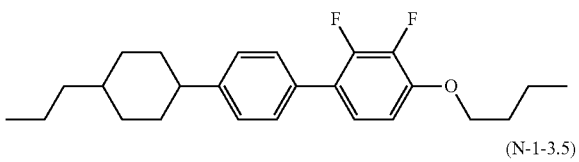

(N-1-3.5)

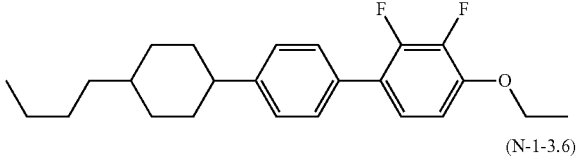

(N-1-3.6)

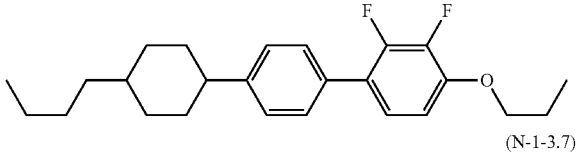

(N-1-3.7)

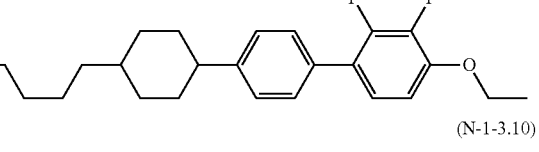

(N-1-3.10)

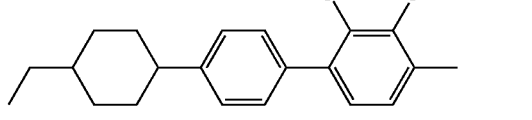

-continued

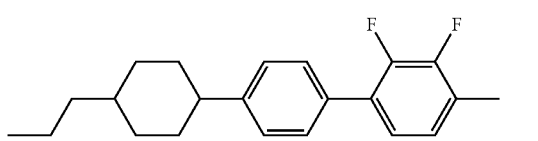
(N-1-3.11)

Although compounds represented by formulae (N-1-3.1) to (N-1-3.4) and (N-1-3.6) can be used alone or in combination, a combination of formulae (N-1-3.1) and (N-1-3.2) and a combination of two or three compounds selected from the compounds represented by formulae (N-1-3.3), (N-1-3.4), and (N-1-3.6) are preferable. The lower limit of the preferable content of these compounds alone or in combination relative to the total amount of the liquid crystal composition of the present invention is 5 mass % (hereinafter, mass % is simply referred to as %), 10%, 13%, 15%, 17%, or 20%. The upper limit of the preferable content relative to the total amount of the liquid crystal composition of the present invention is 35%, 30%, 28%, 25%, 23%, 20%, 18%, 15%, or 13%.

Compounds represented by general formula (N-1-4) are as follows.

[Chem. 17]

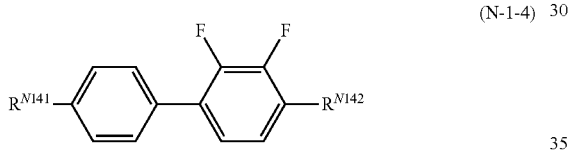
(N-1-4)

(In the formula, $R^{N141}$ and $R^{N142}$ are each independently the same as $R^{N11}$ and $R^{N12}$ in general formula (N-1).)

$R^{N141}$ and $R^{N142}$ preferably each independently represent an alkyl group having 1 to 5 carbon atoms, an alkenyl group having 4 or 5 carbon atoms, or an alkoxy group having 1 to 4 carbon atoms, and preferably each represent a methyl group, a propyl group, an ethoxy group, or a butoxy group.

The compounds represented by general formula (N-1-4) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

When improving Δε is important, the content is preferably set to a relatively high level. When solubility at low temperatures is important, it is highly effective to set the content to a relatively high level. When $T_N$ is important, it is highly effective to set the content to a relatively low level. In order to improve drop marks and image-sticking properties, the content range is preferably set to an intermediate level.

The lower limit of the preferable content of the compound represented by formula (N-1-4) relative to the total amount of the liquid crystal composition of the present invention is 3 mass % (hereinafter, mass % is simply referred to as %), 5%, 7%, 10%, 13%, 15%, 17%, or 20%. The upper limit of the preferable content relative to the total amount of the liquid crystal composition of the present invention is 35%, 30%, 28%, 25%, 23%, 20%, 18%, 15%, 13%, 11%, 10%, or 8%.

Furthermore, the compounds represented by general formula (N-1-4) are preferably compounds selected from the group of compounds represented by formulae (N-1-4.1) to (N-1-4.14), are preferably compounds represented by formula (N-1-4.1) to (N-1-4.4), and are preferably compounds represented by formulae (N-1-4.1) and (N-1-4.2).

[Chem. 18]

(N-1-4.1)

(N-1-4.2)

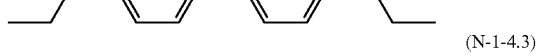
(N-1-4.3)

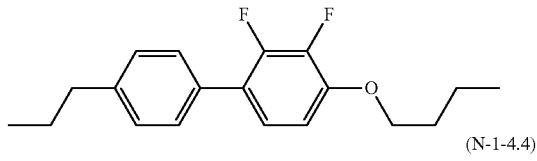
(N-1-4.4)

(N-1-4.11)

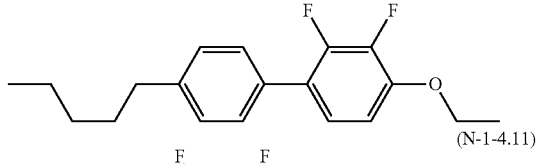
(N-1-4.12)

(N-1-4.13)

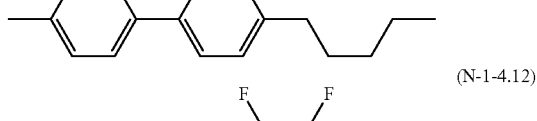
(N-1-4.14)

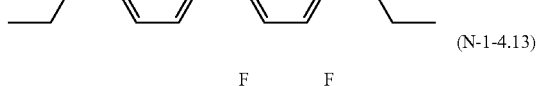

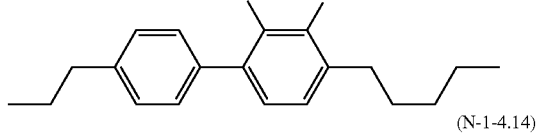

Although the compounds represented by formulae (N-1-4.1) to (N-1-4.4) can be used alone or in combination, the lower limit of the preferable content of these compounds alone or in combination relative to the total amount of the liquid crystal composition of the present invention is 3 mass % (hereinafter, mass % is simply referred to as %), 5%, 7%, 10%, 13%, 15%, 17%, or 20%. The upper limit of the preferable content relative to the total amount of the liquid crystal composition of the present invention is 35%, 30%, 28%, 25%, 23%, 20%, 18%, 15%, 13%, 11%, 10%, or 8%.

Compounds represented by general formula (N-1-5) are as follows.

[Chem. 19]

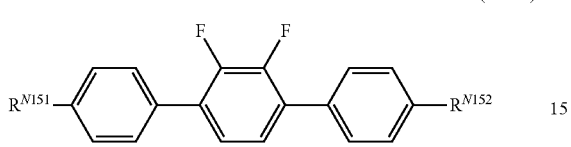

(N-1-5)

(In the formula, $R^{N151}$ and $R^{N152}$ are each independently the same as $R^{N11}$ and $R^{N12}$ in general formula (N-1).)

$R^{N151}$ and $R^{N152}$ preferably each independently represent an alkyl group having 1 to 5 carbon atoms, an alkenyl group having 4 or 5 carbon atoms, or an alkoxy group having 1 to 4 carbon atoms, and preferably each represent an ethyl group, a propyl group, or a butyl group.

The compounds represented by general formula (N-1-5) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

When improving Δε is important, the content is preferably set to a relatively high level. When solubility at low temperatures is important, it is highly effective to set the content to a relatively low level. When $T_{NI}$ is important, it is highly effective to set the content to a relatively high level. In order to improve drop marks and image-sticking properties, the content range is preferably set to an intermediate level.

The lower limit of the preferable content of the compound represented by formula (N-1-5) relative to the total amount of the liquid crystal composition of the present invention is 5 mass % (hereinafter, mass % is simply referred to as %), 8%, 10%, 13%, 15%, 17%, or 20%. The upper limit of the preferable content relative to the total amount of the liquid crystal composition of the present invention is 35%, 33%, 30%, 28%, 25%, 23%, 20%, 18%, 15%, or 13%.

Furthermore, the compounds represented by general formula (N-1-5) are preferably compounds selected from the group of compounds represented by formulae (N-1-5.1) to (N-1-5.6), and are preferably compounds represented by formula (N-1-3.2) and (N-1-3.4).

[Chem. 20]

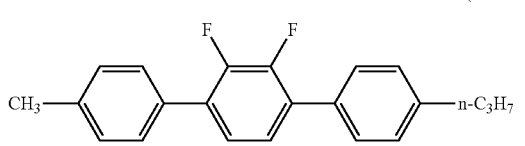

(N-1-5.1)

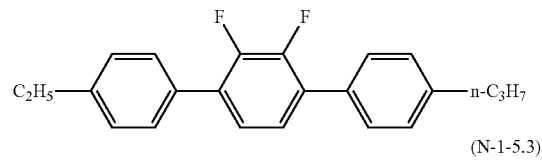

(N-1-5.2)

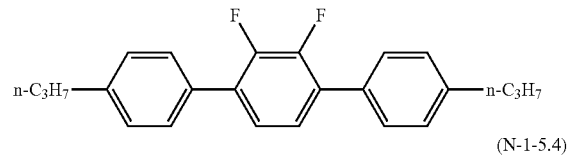

(N-1-5.3)

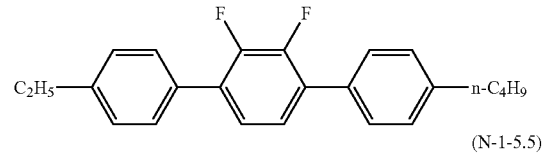

(N-1-5.4)

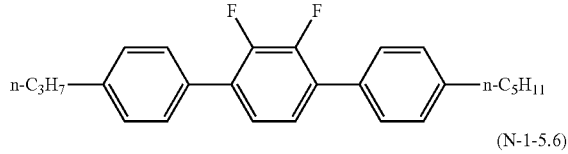

(N-1-5.5)

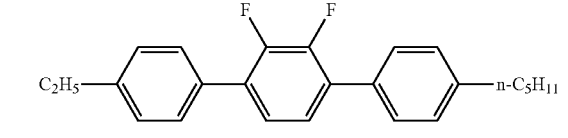

(N-1-5.6)

Although the compounds represented by formulae (N-1-3.2) and (N-1-3.4) can be used alone or in combination, the lower limit of the preferable content of these compounds alone or in combination relative to the total amount of the liquid crystal composition of the present invention is 5 mass % (hereinafter, mass % is simply referred to as %), 8%, 10%, 13%, 15%, 17%, or 20%. The upper limit of the preferable content relative to the total amount of the liquid crystal composition of the present invention is 35%, 33%, 30%, 28%, 25%, 23%, 20%, 18%, 15%, or 13%.

Compounds represented by general formula (N-1-10) are as follows.

[Chem. 21]

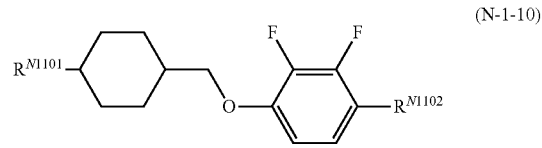

(N-1-10)

(In the formula, $R^{N1101}$ and $R^{N1102}$ are each independently the same as $R^{N11}$ and $R^{N12}$ in general formula (N-1).)

$R^{N1101}$ preferably represents an alkyl group having 1 to 5 carbon atoms or an alkenyl group having 2 to 5 carbon atoms, and preferably represents an ethyl group, a propyl group, or a butyl group. $R^{N1102}$ preferably represents an alkyl group having 1 to 5 carbon atoms, an alkenyl group having 4 or 5 carbon atoms, or an alkoxy group having 1 to 4 carbon atoms, and preferably represents an ethoxy group, a propoxy group, or a butoxy group.

The compounds represented by general formula (N-1-10) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

When improving Δε is important, the content is preferably set to a relatively high level. When solubility at low temperatures is important, it is highly effective to set the content to a relatively high level. When TI is important, it is highly effective to set the content to a relatively high level. In order to improve drop marks and image-sticking properties, the content range is preferably set to an intermediate level.

The lower limit of the preferable content of the compound represented by formula (N-1-10) relative to the total amount of the liquid crystal composition of the present invention is 5 mass % (hereinafter, mass % is simply referred to as %), 10%, 13%, 15%, 17%, or 20%. The upper limit of the preferable content relative to the total amount of the composition of the present invention is 35%, 30%, 28%, 25%, 23%, 20%, 18%, 15%, or 13%.

Furthermore, the compounds represented by general formula (N-1-10) are preferably compounds selected from the group of compounds represented by formulae (N-1-10.1) to (N-1-10.11), are preferably compounds represented by formula (N-1-10.1) to (N-1-10.5), and are preferably compounds represented by formulae (N-1-10.1) and (N-1-10.2).

[Chem. 22]

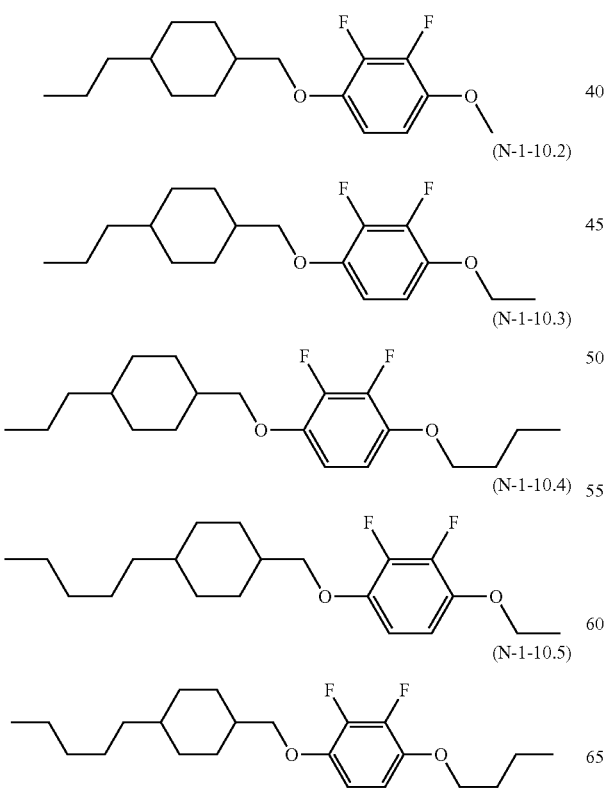

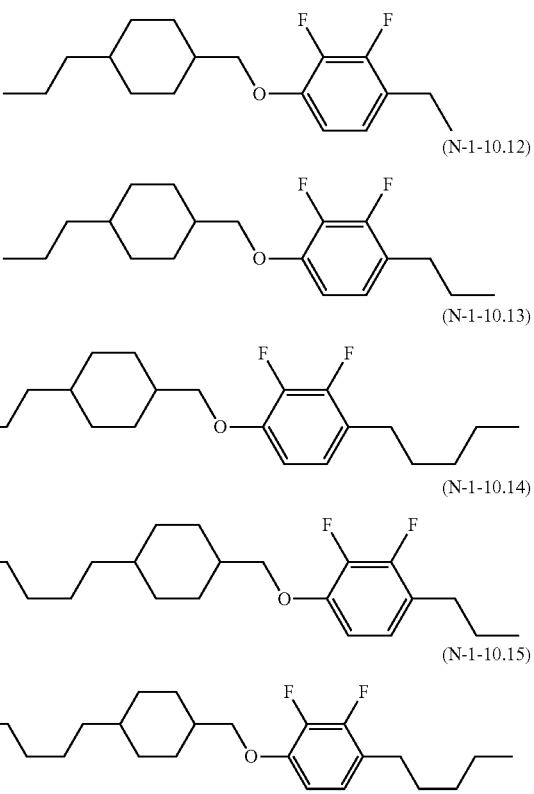

Although the compounds represented by formulae (N-1-10.1) and (N-1-10.2) can be used alone or in combination, the lower limit of the preferable content of these compounds alone or in combination relative to the total amount of the liquid crystal composition of the present invention is 5 mass % (hereinafter, mass % is simply referred to as %), 10%, 13%, 15%, 17%, or 20%. The upper limit of the preferable content relative to the total amount of the liquid crystal composition of the present invention is 35%, 30%, 28%, 25%, 23%, 20%, 18%, 15%, or 13%.

Compounds represented by general formula (N-1-1i) are as follows.

[Chem. 23]

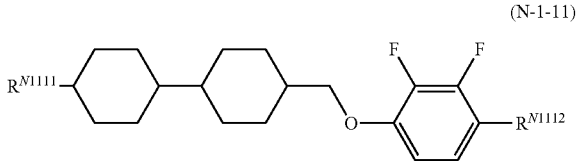

(In the formula, $R^{N1111}$ and $R^{N1112}$ are each independently the same as $R^{N11}$ and $R^{N12}$ in general formula (N-1).)

$R^{N1111}$ preferably represents an alkyl group having 1 to 5 carbon atoms or an alkenyl group having 2 to 5 carbon atoms, and preferably represents an ethyl group, a propyl group, or a butyl group. $R^{N1112}$ preferably represents an alkyl group having 1 to 5 carbon atoms, an alkenyl group having 4 or 5 carbon atoms, or an alkoxy group having 1 to 4 carbon atoms, and preferably represents an ethoxy group, a propoxy group, or a butoxy group.

The compounds represented by general formula (N-1-11) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

When improving Δε is important, the content is preferably set to a relatively high level. When solubility at low temperatures is important, it is highly effective to set the content to a relatively high level. When $T_N$ is important, it is highly effective to set the content to a relatively high level. In order to improve drop marks and image-sticking properties, the content range is preferably set to an intermediate level.

The lower limit of the preferable content of the compound represented by formula (N-1-11) relative to the total amount of the liquid crystal composition of the present invention is 5 mass % (hereinafter, mass % is simply referred to as %), 10%, 13%, 15%, 17%, or 20%. The upper limit of the preferable content relative to the total amount of the liquid crystal composition of the present invention is 35%, 30%, 28%, 25%, 23%, 20%, 18%, 15%, or 13%.

Furthermore, the compounds represented by general formula (N-1-11) are preferably compounds selected from the group of compounds represented by formulae (N-1-11.1) to (N-1-11.15), are preferably compounds represented by formula (N-1-11.1) to (N-1-11.15), and are preferably compounds represented by formulae (N-1-11.2) and (N-1-11.4).

[Chem. 24]

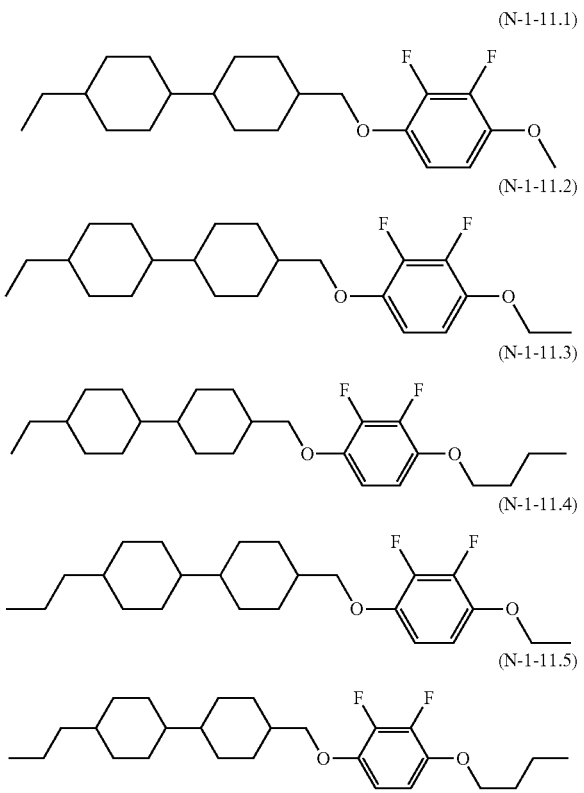

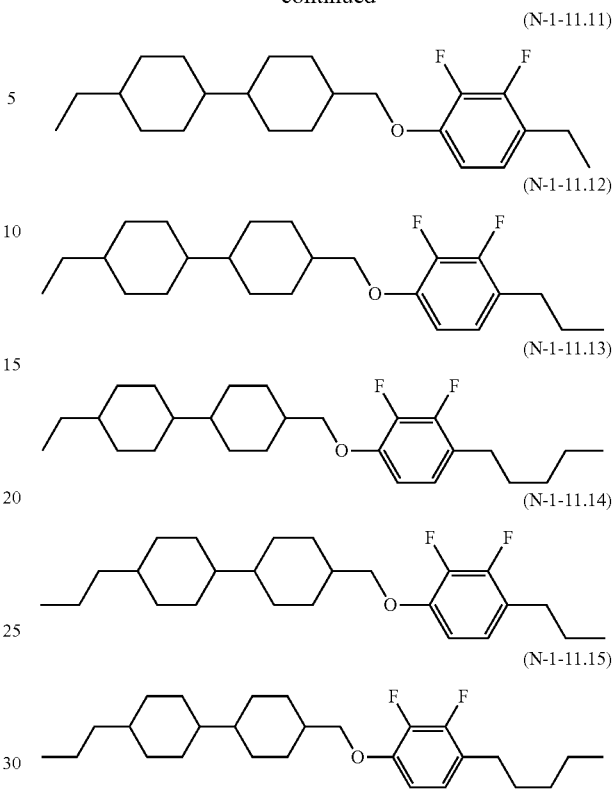

Although the compounds represented by formulae (N-1-11.2) and (N-1-11.4) can be used alone or in combination, the lower limit of the preferable content of these compounds alone or in combination relative to the total amount of the liquid crystal composition of the present invention is 5 mass % (hereinafter, mass % is simply referred to as %), 10%, 13%, 15%, 17%, or 20%. The upper limit of the preferable content relative to the total amount of the liquid crystal composition of the present invention is 35%, 30%, 28%, 25%, 23%, 20%, 18%, 15%, or 13%.

The total amount of the compounds represented by general formula (N-1), general formula (N-2), and general formula (N-3) relative to the total amount of the liquid crystal composition of the present invention (the total amount of the liquid crystal compounds contained in the liquid crystal composition) is preferably 10 to 90 mass %, more preferably 20 to 80 mass %, more preferably 20 to 70 mass %, more preferably 20 to 60 mass %, more preferably 20 to 55 mass %, more preferably 25 to 55 mass %, and particularly preferably 30 to 55 mass %.

More specifically, the lower limit of the total amount of the compounds represented by general formula (N-1), general formula (N-2), and general formula (N-3) contained in the liquid crystal composition is 1 mass % (hereinafter mass % is referred to as %) or more, preferably 5% or more, preferably 10% or more, preferably 13% or more, preferably 15% or more, preferably 18% or more, preferably 20% or more, preferably 23% or more, preferably 25% or more, preferably 28% or more, preferably 30% or more, preferably 33% or more, preferably 35% or more, preferably 38% or more, or preferably 40% or more. The upper limit is preferably 95% or less, preferably 90% or less, preferably 88% or less, preferably 85% or less, preferably 83% or less, preferably 80% or less, preferably 78% or less, preferably 75% or less, preferably 73% or less, preferably 70% or less, preferably 68% or less, preferably 65% or less, preferably 63% or less, preferably 60% or less, preferably 55% or less, preferably 50% or less, or preferably 40% or less.

The liquid crystal composition of the present invention preferably contains one compound or two or more compounds represented by general formula (L). Compounds that are substantially dielectrically neutral (the value of Δε is −2 to 2) correspond to the compounds represented by general formula (L).

[Chem. 25]

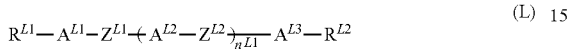
(L)

(In the formula, $R^{L1}$ and $R^{L2}$ each independently represent an alkyl group having 1 to 8 carbon atoms, in which one —$CH_2$- or two or more non-adjacent —$CH_2$— in the alkyl group may each independently be substituted with —CH=CH—, —C≡C—, —O—, —CO—, —COO—, or —OCO—, $n^{Li}$ represents 0, 1, 2, or 3, $A^{L1}$, $A^{L2}$, and $A^{L3}$ each independently represent a group selected from the group consisting of:
(a) a 1,4-cyclohexylene group (one —$CH_2$— or two or more non-adjacent —$CH_2$— present in this group may each be substituted with —O—), and
(b) a 1,4-phenylene group (one —CH= or two or more non-adjacent —CH=present in this group may each be substituted with —N=),
(c) a naphthalene-2,6-diyl group, a 1,2,3,4-tetrahydronaphthalene-2,6-diyl group, or a decahydronaphthalene-2,6-diyl group (one —CH= or two or more non-adjacent —CH=present in the naphthalene-2,6-diyl group or the 1,2,3,4-tetrahydronaphthalene-2,6-diyl group may each be substituted with —N=),
and the groups (a), (b), and (c) described above may each independently be substituted with a cyano group, a fluorine atom, or a chlorine atom, $Z^{L1}$ and $Z^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, and when $n^{L1}$ is 2 or 3 and there are more than one $A^{L2}$, they may be the same or different, and when $n^{L1}$ is 2 or 3 and there are more than one $Z^{L3}$, they may be the same or different but the compounds represented by general formula (N-1), general formula (N-2), and general formula (N-3) are excluded.)

The compounds represented by general formula (L) may be used alone or can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1 in one embodiment of the present invention. In other embodiments of the present invention, the number is 2, 3, 4, 5, 6, 7, 8, 9, 10, or more.

In the composition of the present invention, the content of the compound represented by general formula (L) needs to be appropriately adjusted according to the desired properties, such as solubility at low temperatures, transition temperature, electrical reliability, birefringence index, process compatibility, drop marks, image-sticking, and dielectric anisotropy.

The lower limit of the preferable content of the compound represented by formula (L) relative to the total amount of the liquid crystal composition of the present invention is 1 mass % (hereinafter, mass % is simply referred to as %), 10%, 20%, 30%, 40%, 50%, 55%, 60%, 65%, 70%, 75%, or 80%. The upper limit of the preferable content 95%, 85%, 75%, 65%, 55%, 45%, 35%, or 25%.

In order to keep the viscosity of the composition of the present invention low and when a composition having high response speed is necessary, the aforementioned lower limit is preferably high and the upper limit is preferably high. Furthermore, in order to keep Tni of the composition of the present invention high and when a composition having high good temperature stability is necessary, the aforementioned lower limit is preferably high and the upper limit is preferably high. Moreover, when it is desirable to increase the dielectric anisotropy to keep low driving voltage, the aforementioned lower limit is preferably low and the upper limit is preferably low.

When reliability is important, $R^{L1}$ and $R^{L2}$ preferably both represent an alkyl group; when decreasing the volatility of the compound is important, $R^{L1}$ and $R^{L2}$ preferably both represent an alkoxy group; and when decreasing the viscosity is important, at least one of $R^1$ and $R^{L2}$ is preferably an alkenyl group.

When the cyclic structure that each of $R^{L1}$ and $R^{L2}$ bonds to is a phenyl group (an aromatic), a linear alkyl group having 1 to 5 carbon atoms, a linear alkoxy group having 1 to 4 carbon atoms, and an alkenyl group having 4 or 5 carbon atoms are preferable; and when the cyclic structure that the group bonds to is a saturated cyclic structure, such as cyclohexane, pyran, and dioxane, a linear alkyl group having 1 to 5 carbon atoms, a linear alkoxy group having 1 to 4 carbon atoms, and a linear alkenyl group having 2 to 5 carbon atoms are preferable. In order to stabilize the nematic phase, the total number of carbon atoms and, if any, oxygen atoms is preferably 5 or less, and the structure is preferably linear.

The alkenyl group is preferably the one selected from the groups represented by formulae (R1) to (R5). (In each of the formulae, the black dot represents a carbon atom in the cyclic structure.)

[Chem. 26]

 (R1)

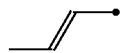 (R2)

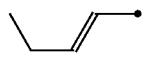 (R3)

 (R4)

 (R5)

When response speed is important, $n^{L1}$ is preferably 0, when the nematic phase upper limit temperature is to be improved, $n^{L1}$ is preferably 2 or 3, and when these properties need to be balanced, $n^{L1}$ is preferably 1. In order to satisfy the properties demanded of the composition, compounds with different values are preferably used in combination.

$A^{L1}$, $A^{L2}$, and $A^{L3}$ are preferably each an aromatic when increasing Δn is required, or an aliphatic when improving the response speed is required, and preferably each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably each independently represent the following structure:

[Chem. 27]

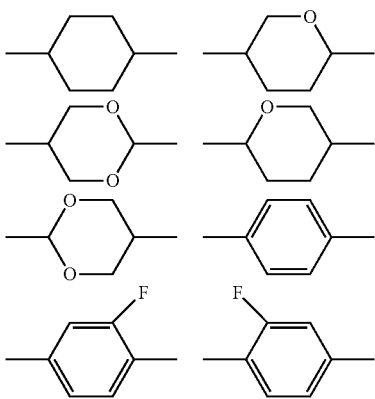

and yet more preferably each independently represent a trans-1,4-cyclohexylene group or a 1,4-phenylene group.

When the response speed is important, $Z^{L1}$ and $Z^{L2}$ preferably each represent a single bond.

Compounds represented by general formula (L) are preferably compounds selected from the group of compounds represented by general formulae (L-1) to (L-7).

Compounds represented by general formula (L-1) are as follows.

[Chem. 28]

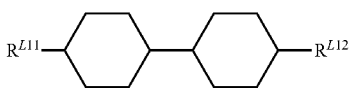
(L-1)

(In the formula, $R^{L11}$ and $R^{L12}$ are each independently the same as $R^{L1}$ and $R^{L2}$ in general formula (L).)

$R^{L11}$ and $R^{L12}$ preferably each represent a linear alkyl group having 1 to 5 carbon atoms, a linear alkoxy group having 1 to 4 carbon atoms, or a linear alkenyl group having 2 to 5 carbon atoms.

The compounds represented by general formula (L-1) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

The lower limit of the preferable content relative to the total amount of the liquid crystal composition of the present invention is 1 mass % (hereinafter, mass % is simply referred to as %), 2%, 3%, 5%, 7%, 10%, 15%, 20%, 25%, 30%, 35%, 40%, 45%, 50%, or 55%. The upper limit of the preferable content relative to the total amount of the composition of the present invention is 95%, 90%, 85%, 80%, 75%, 70%, 65%, 60%, 55%, 50%, 45%, 40%, 35%, 30%, or 25%.

In order to keep the viscosity of the composition of the present invention low and when a composition having high response speed is necessary, the aforementioned lower limit is preferably high and the upper limit is preferably high. Furthermore, in order to keep Tni of the composition of the present invention high and when a composition having high good temperature stability is necessary, the aforementioned lower limit is preferably intermediate and the upper limit is preferably intermediate. Moreover, when it is desirable to increase the dielectric anisotropy to keep low driving voltage, the aforementioned lower limit is preferably low and the upper limit is preferably low.

The compound represented by general formula (L-1) is preferably a compound selected from the group of compounds represented by general formula (L-1-1).

[Chem. 29]

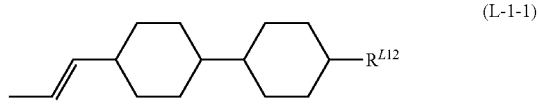
(L-1-1)

(In the formula, $R^{L12}$ is the same as that in general formula (L-1).)

The compounds represented by general formula (L-1-1) are preferably compounds selected from the group of compounds represented by formulae (L-1-1.1) to (L-1-1.3), are preferably a compound represented by formula (L-1-1.2) or (L-1-1.3), and are preferably a compound represented by formula (L-1-1.3).

[Chem. 30]

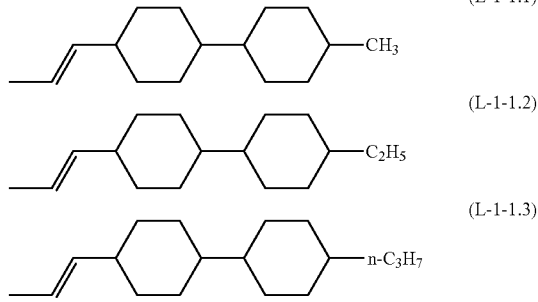

The lower limit of the preferable content of the compound represented by formula (L-1-1.3) relative to the total amount of the liquid crystal composition of the present invention is 1 mass % (hereinafter, mass % is simply referred to as %), 2%, 3%, 5%, 7%, or 10%. The upper limit of the preferable content relative to the total amount of the composition of the present invention is 20%, 15%, 13%, 10%, 8%, 7%, 6%, 5%, or 3%.

The compound represented by general formula (L-1) is preferably a compound selected from the group of compounds represented by general formula (L-1-2).

[Chem. 31]

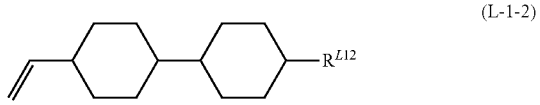

(L-1-2)

(In the formula, $R^{L12}$ is the same as that in general formula (L-1).)

The lower limit of the preferable content of the compound represented by formula (L-1-2) relative to the total amount of the liquid crystal composition of the present invention is 1 mass % (hereinafter, mass % is simply referred to as %), 5%, 10%, 15%, 17%, 20%, 23%, 25%, 27%, 30%, or 35%. The upper limit of the preferable content relative to the total amount of the composition of the present invention is 60%, 55%, 50%, 45%, 42%, 40%, 38%, 35%, 33%, or 30%.

Furthermore, the compounds represented by general formula (L-1-2) are preferably compounds selected from the group of compounds represented by formulae (L-1-2.1) to (L-1-2.4), and are preferably compounds represented by formulae (L-1-2.2) to (L-1-2.4). In particular, the compound represented by formula (L-1-2.2) is preferable since the response speed of the composition of the present invention is particularly improved. In addition, when high Tni is desirable rather than the response speed, the compound represented by formula (L-1-2.3) or (L-1-2.4) is preferably used. The amount of the compounds represented by formulae (L-1-2.3) and (L-1-2.4) is preferably not 30 mass % or more in order to improve the solubility at low temperatures.

[Chem. 32]

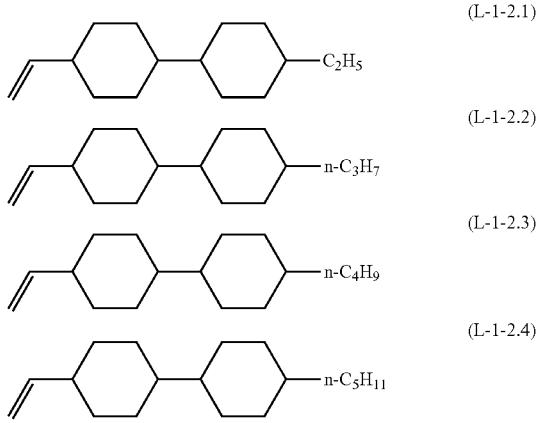

(L-1-2.1)
(L-1-2.2)
(L-1-2.3)
(L-1-2.4)

The lower limit of the preferable content of the compound represented by formula (L-1-2.2) relative to the total amount of the liquid crystal composition of the present invention is 10 mass % (hereinafter, mass % is simply referred to as %), 15%, 18%, 20%, 23%, 25%, 27%, 30%, 33%, 35%, 38%, or 40%. The upper limit of the preferable content relative to the total amount of the composition of the present invention is 60%, 55%, 50%, 45%, 43%, 40%, 38%, 35%, 32%, 30%, 27%, 25%, or 22%.

The lower limit of the preferable total amount of the compounds represented by formulae (L-1-1.3) and (L-1-2.2) relative to the total amount of the liquid crystal composition of the present invention is 10 mass % (hereinafter, mass % is simply referred to as %), 15%, 20%, 25%, 27%, 30%, 35%, or 40%. The upper limit of the preferable content relative to the total amount of the composition of the present invention is 60%, 55%, 50%, 45%, 43%, 40%, 38%, 35%, 32%, 30%, 27%, 25%, or 22%.

The compound represented by general formula (L-1) is preferably a compound selected from the group of compounds represented by general formula (L-1-3).

[Chem. 33]

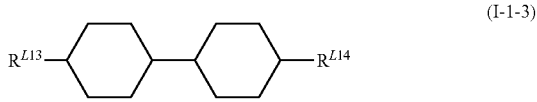

(I-1-3)

(In the formula, $R^{L13}$ and $R^{L14}$ preferably each independently represent an alkyl group having 1 to 8 carbon atoms or an alkoxy group having 1 to 8 carbon atoms.)

$R^{L13}$ and $R^{L14}$ preferably each represent a linear alkyl group having 1 to 5 carbon atoms, a linear alkoxy group having 1 to 4 carbon atoms, or a linear alkenyl group having 2 to 5 carbon atoms.

The lower limit of the preferable content of the compound represented by formula (L-1-3) relative to the total amount of the liquid crystal composition of the present invention is 1 mass % (hereinafter, mass % is simply referred to as %), 5%, 10%, 13%, 15%, 17%, 20%, 23%, 25%, or 30%. The upper limit of the preferable content relative to the total amount of the composition of the present invention is 60%, 55%, 50%, 45%, 40%, 37%, 35%, 33%, 30%, 27%, 25%, 23%, 20%, 17%, 15%, 13%, or 10%. Furthermore, the compounds represented by general formula (L-1-3) are preferably compounds selected from the group of compounds represented by formulae (L-1-3.1) to (L-1-3.12), and are preferably a compound represented by formula (L-1-3.1), (L-1-3.3), or (L-1-3.4). In particular, the compound represented by formula (L-1-3.1) is preferable since the response speed of the composition of the present invention is particularly improved. In addition, when high Tni is desirable rather than the response speed, the compounds represented by formulae (L-1-3.3), (L-1-3.4), (L-1-3.11), and (L-1-3.12) are preferably used. The total amount of the compounds represented by formulae (L-1-3.3), (L-1-3.4), (L-1-3.11), and (L-1-3.12) is preferably not 20 mass % or more in order to improve the solubility at low temperatures.

[Chem. 34]

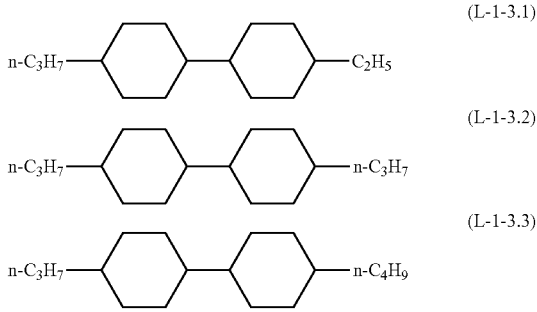

(L-1-3.1)
(L-1-3.2)
(L-1-3.3)

-continued

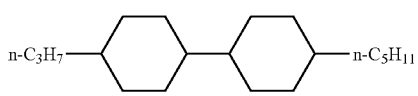
(L-1-3.4)

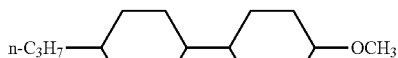
(L-1-3.11)

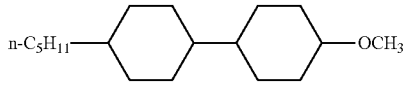
(L-1-3.12)

The lower limit of the preferable content of the compound represented by formula (L-1-3.1) relative to the total amount of the liquid crystal composition of the present invention is 1 mass % (hereinafter, mass % is simply referred to as %), 2%, 3%, 5%, 7%, 10%, 13%, 15%, 18%, or 20%. The upper limit of the preferable content relative to the total amount of the composition of the present invention is 20%, 17%, 15%, 13%, 10%, 8%, 7%, or 6%.

The compound represented by general formula (L-1) is preferably a compound selected from the group of compounds represented by general formula (L-1-4) and/or (L-1-5).

[Chem. 35]

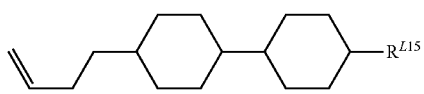
(I-1-4)

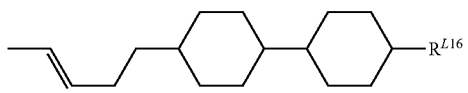
(I-1-5)

(In the formula, $R^{L15}$ and $R^{L16}$ preferably each independently represent an alkyl group having 1 to 8 carbon atoms or an alkoxy group having 1 to 8 carbon atoms.)

$R^{L15}$ and $R^{L16}$ preferably each represent a linear alkyl group having 1 to 5 carbon atoms, a linear alkoxy group having 1 to 4 carbon atoms, or a linear alkenyl group having 2 to 5 carbon atoms.

The lower limit of the preferable content of the compound represented by formula (L-1-4) relative to the total amount of the liquid crystal composition of the present invention is 1 mass % (hereinafter, mass % is simply referred to as %), 5%, 10%, 13%, 15%, 17%, or 20%. The upper limit of the preferable content relative to the total amount of the composition of the present invention is 25%, 23%, 20%, 17%, 15%, 13%, or 10%.

The lower limit of the preferable content of the compound represented by formula (L-1-5) relative to the total amount of the liquid crystal composition of the present invention is 1 mass % (hereinafter, mass % is simply referred to as %), 5%, 10%, 13%, 15%, 17%, or 20%. The upper limit of the preferable content relative to the total amount of the composition of the present invention is 25%, 23%, 20%, 17%, 15%, 13%, or 10%.

Furthermore, the compounds represented by general formulas (L-1-4) and (L-1-5) are preferably compounds selected from the group of compounds represented by general formulae (L-1-4.1) to (L-1-5.3), and are preferably a compound represented by formula (L-1-4.2) or (L-1-5.2).

[Chem. 36]

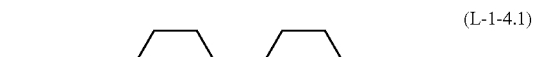
(L-1-4.1)

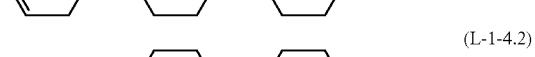
(L-1-4.2)

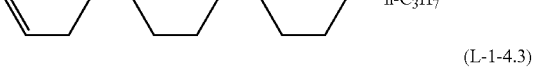
(L-1-4.3)

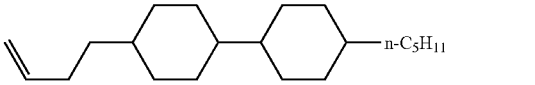
(L-1-5.1)

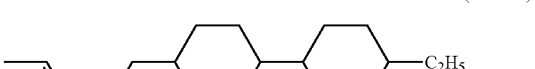
(L-1-5.2)

(L-1-5.3)

The lower limit of the preferable content of the compound represented by formula (L-1-4.2) relative to the total amount of the liquid crystal composition of the present invention is 1 mass % (hereinafter, mass % is simply referred to as %), 2%, 3%, 5%, 7%, 10%, 13%, 15%, 18%, or 20%. The upper limit of the preferable content relative to the total amount of the composition of the present invention is 20%, 17%, 15%, 13%, 10%, 8%, 7%, or 6%.

Two or more compounds selected from the compounds represented by formulae (L-1-1.3), (L-1-2.2), (L-1-3.1), (L-1-3.3), (L-1-3.4), (L-1-3.11), and (L-1-3.12) are preferably used in combination, two or more compounds selected from the compounds represented by formulae (L-1-1.3), (L-1-2.2), (L-1-3.1), (L-1-3.3), (L-1-3.4), and (L-1-4.2) are preferably used in combination, the lower limit of the preferable total amount of these compounds relative to the total amount of the liquid crystal composition of the present invention is 1 mass % (hereinafter mass % is simply referred to as %), 2%, 3%, 5%, 7%, 10%, 13%, 15%, 18%, 20%, 23%, 25%, 27%, 30%, 33%, or 35%, and the upper limit relative to the total amount of the liquid crystal composition of the present invention is 80%, 70%, 60%, 50%, 45%, 40%, 37%, 35%, 33%, 30%, 28%, 25%, 23%, or 20%. When the reliability of the composition is important, two or more compounds selected from the compounds represented by formulae (L-1-3.1), (L-1-3.3), and (L-1-3.4)) are preferably used in combination, and when the response speed of the composition is important, two or more compounds selected from the compounds represented by formulae (L-1-1.3) and (L-1-2.2) are preferably used in combination.

Compounds represented by general formula (L-2) are as follows.

[Chem. 37]

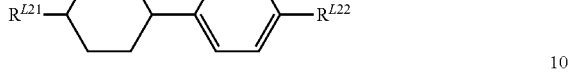
(L-2)

(In the formula, $R^{L21}$ and $R^{L22}$ are each independently the same as $R^{L1}$ and $R^{L2}$ in general formula (L).)

$R^{L21}$ preferably represents an alkyl group having 1 to 5 carbon atoms or an alkenyl group having 2 to 5 carbon atoms, and $R^{L22}$ preferably represents an alkyl group having 1 to 5 carbon atoms, an alkenyl group having 4 or 5 carbon atoms, or an alkoxy group having 1 to 4 carbon atoms.

The compounds represented by general formula (L-1) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

When solubility at low temperatures is important, it is highly effective to set the content to a relatively high level, and, on the contrary, when the response speed is important, it is highly effective to set the content to a relatively low level. In order to improve drop marks and image-sticking properties, the content range is preferably set to an intermediate level.

The lower limit of the preferable content of the compound represented by formula (L-2) relative to the total amount of the liquid crystal composition of the present invention is 1 mass % (hereinafter, mass % is simply referred to as %), 2%, 3%, 5%, 7%, or 10%. The upper limit of the preferable content relative to the total amount of the liquid crystal composition of the present invention is 20%, 15%, 13%, 10%, 8%, 7%, 6%, 5%, or 3%.

Furthermore, the compounds represented by general formula (L-2) are preferably compounds selected from the group of compounds represented by formulae (L-2.1) to (L-2.6), and are preferably compounds represented by formulae (L-2.1), (L-2.3), (L-2.4), and (L-2.6).

[Chem. 38]

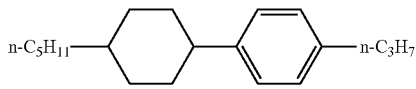
(L-2.1)

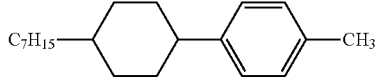
(L-2.2)

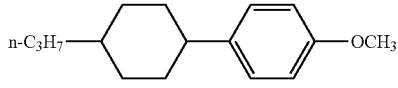
(L-2.3)

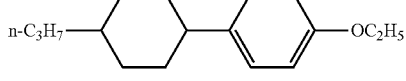
(L-2.4)

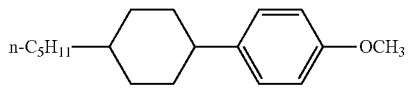
(L-2.5)

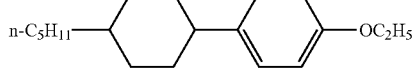
(L-2.6)

Compounds represented by general formula (L-3) are as follows.

[Chem. 39]

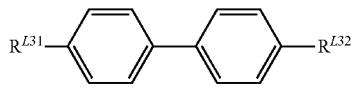
(L-3)

(In the formula, $R^{L31}$ and $R^{L32}$ are each independently the same as $R^{L1}$ and $R^{L2}$ in general formula (L).)

$R^{L31}$ and $R^{L32}$ preferably each independently represent an alkyl group having 1 to 5 carbon atoms, an alkenyl group having 4 or 5 carbon atoms, or an alkoxy group having 1 to 4 carbon atoms.

The compounds represented by general formula (L-3) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

The lower limit of the preferable content of the compound represented by formula (L-3) relative to the total amount of the liquid crystal composition of the present invention is 1 mass %, 2%, 3%, 5%, 7%, or 10%. The upper limit of the preferable content relative to the total amount of the liquid crystal composition of the present invention is 20%, 15%, 13%, 10%, 8%, 7%, 6%, 5%, or 3%.

When a high birefringence index is to be obtained, it is highly effective to set the content to a relatively high level, and, on the contrary, when high Tni is important, it is highly effective to set the content to a relatively low level. In order to improve drop marks and image-sticking properties, the content range is preferably set to an intermediate level.

Furthermore, the compounds represented by general formula (L-3) are preferably compounds selected from the group of compounds represented by formulae (L-3.1) to (L-3.4), and are preferably compounds represented by formulae (L-3.2) to (L-3.7).

[Chem. 40]

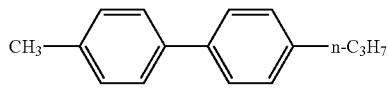
(L-3.1)

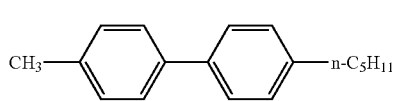
(L-3.2)

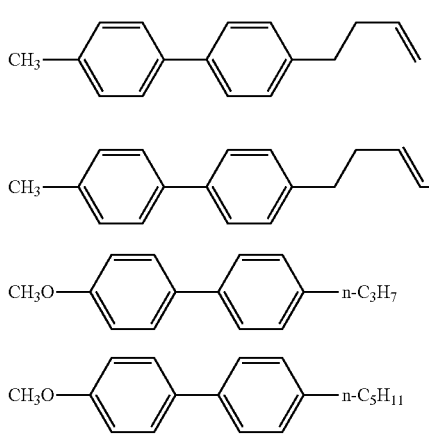

(L-3.3)
(L-3.4)
(L-3.6)
(L-3.7)

Compounds represented by general formula (L-4) are as follows.

[Chem. 41]

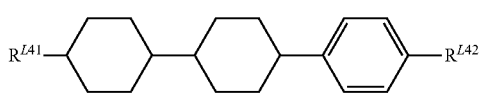

(L-4)

(In the formula, $R^{L41}$ and $R^{L42}$ are each independently the same as $R^{L1}$ and $R^{L2}$ in general formula (L).)

$R^{L41}$ preferably represents an alkyl group having 1 to 5 carbon atoms or an alkenyl group having 2 to 5 carbon atoms, and $R^{L42}$ preferably represents an alkyl group having 1 to 5 carbon atoms, an alkenyl group having 4 or 5 carbon atoms, or an alkoxy group having 1 to 4 carbon atoms.)

The compounds represented by general formula (L-4) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

In the composition of the present invention, the content of the compound represented by general formula (L-4) needs to be appropriately adjusted according to the desired properties, such as solubility at low temperatures, transition temperature, electrical reliability, birefringence index, process compatibility, drop marks, image-sticking, and dielectric anisotropy.

The lower limit of the preferable content of the compound represented by formula (L-4) relative to the total amount of the liquid crystal composition of the present invention is 1 mass % (hereinafter, mass % is simply referred to as %), 2%, 3%, 5%, 7%, 10%, 14%, 16%, 20%, 23%, 26%, 30%, 35%, or 40%. The upper limit of the preferable content of the compound represented by formula (L-4) relative to the total amount of the liquid crystal composition of the present invention is 50%, 40%, 35%, 30%, 20%, 15%, 10%, or 5%.

The compounds represented by general formula (L-4) are preferably compounds represented by formulae (L-4.1) to (L-4.3), for example.

[Chem. 42]

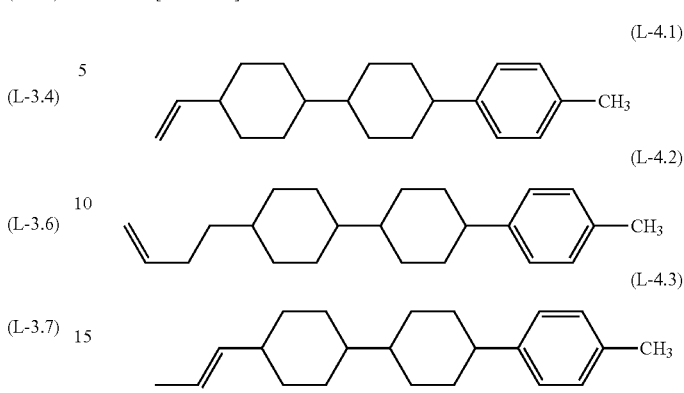

(L-4.1)
(L-4.2)
(L-4.3)

Depending on the desired properties, such as solubility at low temperatures, transition temperature, electrical reliability, and birefringence index, a compound represented by formula (L-4.1) may be contained, a compound represented by formula (L-4.2) may be contained, both a compound represented by formula (L-4.1) and a compound represented by formula (L-4.2) may be contained, and all of compounds represented by formulae (L-4.1) to (L-4.3) may be contained. The lower limit of the preferable content of the compound represented by formula (L-4.1) or (L-4.2) relative to the total amount of the liquid crystal composition of the present invention is 3%, 5%, 7%, 9%, 11%, 12%, 13%, 18%, or 21%, and the preferable upper limit is 45, 40%, 35%, 30%, 25%, 23%, 20%, 18%, 15%, 13%, 10%, or 8%.

When a compound represented by formula (L-4.1) and a compound represented by formula (L-4.2) are both contained, the lower limit of the preferable content of the two compounds relative to the total amount of the liquid crystal composition of the present invention is 15 mass % (hereinafter, mass % is simply referred to as %), 19%, 24%, or 30%, and the preferable upper limit is 45, 40%, 35%, 30%, 25%, 23%, 20%, 18%, 15%, or 13%.

The compounds represented by general formula (L-4) are preferably compounds represented by formulae (L-4.4) to (L-4.6), and are preferably a compound represented by formula (L-4.4).

[Chem. 43]

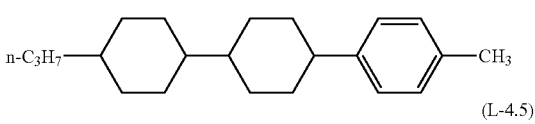

(L-4.4)

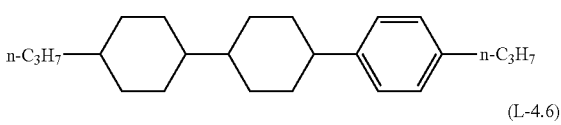

(L-4.5)

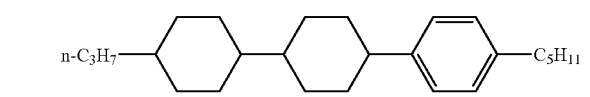

(L-4.6)

Depending on the desired properties, such as solubility at low temperatures, transition temperature, electrical reliability, and birefringence index, a compound represented by formula (L-4.4) may be contained, a compound represented by formula (L-4.5) may be contained, or both a compound represented by formula (L-4.4) and a compound represented by formula (L-4.5) may be contained.

The lower limit of the preferable content of the compound represented by formula (L-4.4) or (L-4.5) relative to the total amount of the liquid crystal composition of the present invention is 3 mass % (hereinafter, mass % is simply referred to as %), 5%, 7%, 9%, 11%, 12%, 13%, 18%, or 21%. The preferable upper limit is 45, 40%, 35%, 30%, 25%, 23%, 20%, 18%, 15%, 13%, 10%, or 8%.

When a compound represented by formula (L-4.4) and a compound represented by formula (L-4.5) are both contained, the lower limit of the preferable content of the two compounds relative to the total amount of the liquid crystal composition of the present invention is 15 mass % (hereinafter, mass % is simply referred to as %), 19%, 24%, or 30%, and the preferable upper limit is 45, 40%, 35%, 30%, 25%, 23%, 20%, 18%, 15%, or 13%.

The compounds represented by general formula (L-4) are preferably compounds represented by formulae (L-4.7) to (L-4.10), and, in particular, are preferably a compound represented by formula (L-4.9).

[Chem. 44]

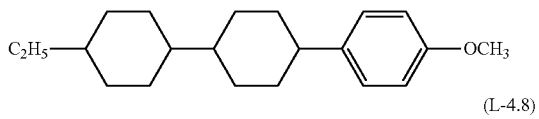
(L-4.7)

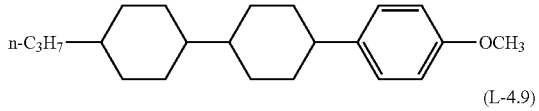
(L-4.8)

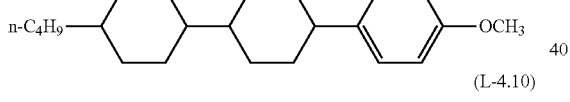
(L-4.9)

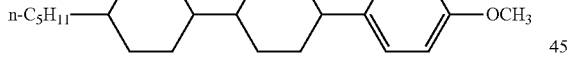
(L-4.10)

Compounds represented by general formula (L-5) are as follows.

[Chem. 45]

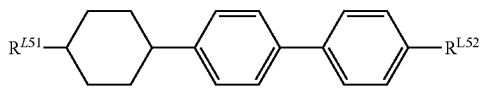
(L-5)

(In the formula, $R^{L51}$ and $R^{L52}$ are each independently the same as $R^{L1}$ and $R^{L2}$ in general formula (L).)

$R^{L51}$ preferably represents an alkyl group having 1 to 5 carbon atoms or an alkenyl group having 2 to 5 carbon atoms, and $R^{L52}$ preferably represents an alkyl group having 1 to 5 carbon atoms, an alkenyl group having 4 or 5 carbon atoms, or an alkoxy group having 1 to 4 carbon atoms.

The compounds represented by general formula (L-5) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index. The number of types of the compounds to be used is, for example, 1, 2, 3, 4, or 5 or more in one embodiment of the present invention.

In the composition of the present invention, the content of the compound represented by general formula (L-5) needs to be appropriately adjusted according to the desired properties, such as solubility at low temperatures, transition temperature, electrical reliability, birefringence index, process compatibility, drop marks, image-sticking, and dielectric anisotropy.

The lower limit of the preferable content of the compound represented by formula (L-5) relative to the total amount of the liquid crystal composition of the present invention is 1 mass % (hereinafter, mass % is simply referred to as %), 2%, 3%, 5%, 7%, 10%, 14%, 16%, 20%, 23%, 26%, 30%, 35%, or 40%. The upper limit of the preferable content of the compound represented by formula (L-5) relative to the total amount of the liquid crystal composition of the present invention is 50%, 40%, 35%, 30%, 20%, 15%, 10%, or 5%

The compounds represented by general formula (L-5) are preferably a compound represented by formula (L-5.1) or (L-5.2), and, in particular, are preferably a compound represented by formula (L-5.1).

The lower limit of the preferable content of these compounds relative to the total amount of the liquid crystal composition of the present invention is 1 mass % (hereinafter, mass % is simply referred to as %), 2%, 3%, 5%, or 7%. The upper limit of the preferable content of these compounds is 20%, 15%, 13%, 10%, or 9%.

[Chem. 46]

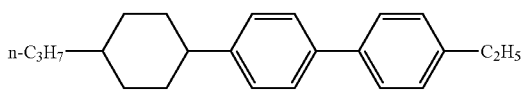
(L-5.1)

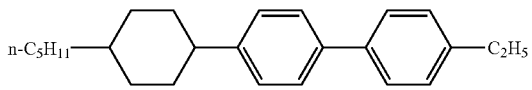
(L-5.2)

The compounds represented by general formula (L-5) are preferably a compound represented by formula (L-5.3) or (L-5.4).

The lower limit of the preferable content of these compounds relative to the total amount of the liquid crystal composition of the present invention is 1 mass % (hereinafter, mass % is simply referred to as %), 2%, 3%, 5%, or 7%. The upper limit of the preferable content of these compounds is 20%, 15%, 13%, 10%, or 9%.

[Chem. 47]

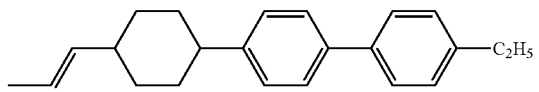
(L-5.3)

-continued (L-5.4)
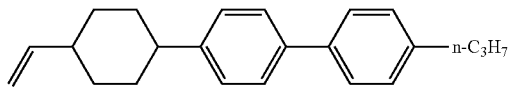

Furthermore, the compounds represented by general formula (L-5) are preferably compounds selected from the group of compounds represented by formulae (L-5.5) to (L-5.7), and are, in particular, preferably a compound represented by formula (L-5.7).

The lower limit of the preferable content of these compounds relative to the total amount of the liquid crystal composition of the present invention is 1 mass % (hereinafter, mass % is simply referred to as %), 2%, 3%, 5%, or 7%. The upper limit of the preferable content of these compounds is 20%, 15%, 13%, 10%, or 9%.

[Chem. 48]

(L-5.5)
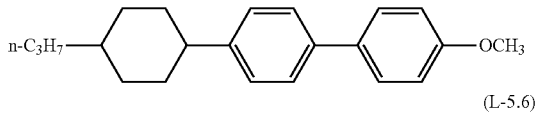

(L-5.6)
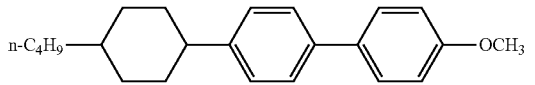

(L-5.7)
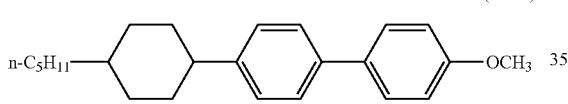

Compounds represented by general formula (L-6) are as follows.

[Chem. 49]

(L-6)
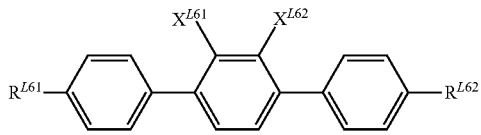

(In the formula, $R^{L61}$ and $R^{L62}$ are each independently the same as $R^{L1}$ and $R^{L2}$ in general formula (L), and $X^{L61}$ and $X^{L62}$ each independently represent a hydrogen atom or a fluorine atom.)

$R^{L61}$ and $R^{L62}$ preferably each independently represent an alkyl group having 1 to 5 carbon atoms or an alkenyl group having 2 or 5 carbon atoms, and one of $X^{L61}$ and $X^{L62}$ is preferably a fluorine atom and the other is preferably a hydrogen atom.

The compounds represented by general formula (L-6) can be used alone, but two or more of these compounds can be used in combination. There is no specific limit on the types of the compounds that can be used in combination, and an appropriate combination is used according to the desired properties such as solubility at low temperatures, transition temperature, electrical reliability, and birefringence index.

The number of types of the compounds to be used is, for example, 1, 2, 3, 4, or 5 or more in one embodiment of the present invention.

The lower limit of the preferable content of the compound represented by formula (L-6) relative to the total amount of the liquid crystal composition of the present invention is 1 mass % (hereinafter, mass % is simply referred to as %), 2%, 3%, 5%, 7%, 10%, 14%, 16%, 20%, 23%, 26%, 30%, 35%, or 40%. The upper limit of the preferable content of the compound represented by formula (L-6) relative to the total amount of the liquid crystal composition of the present invention is 50%, 40%, 35%, 30%, 20%, 15%, 10%, or 5%. When increasing Δn is important, the amount is preferably large, and when precipitation at low temperatures is important, the amount is preferably small.

The compounds represented by general formula (L-6) are preferably compounds represented by formulae (L-6.1) to (L-6.9).

[Chem. 50]

(L-6.1)
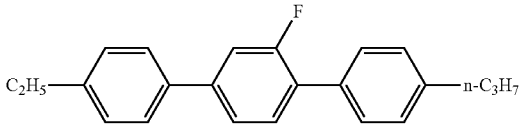

(L-6.2)
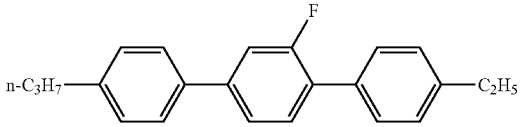

(L-6.3)
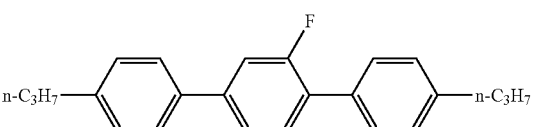

(L-6.4)
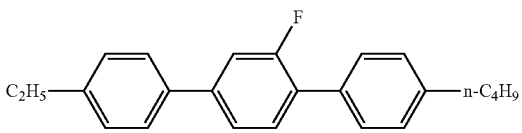

(L-6.5)
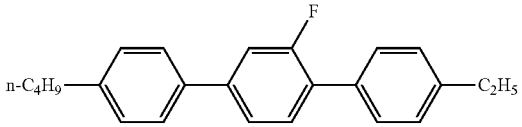

(L-6.6)
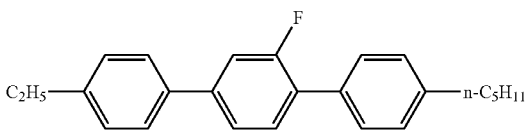

(L-6.7)
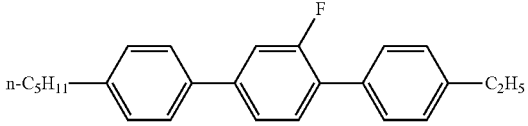

(L-6.8)

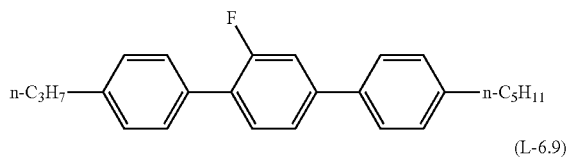

(L-6.9)

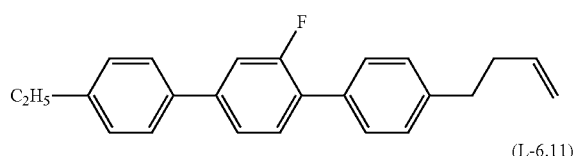

There is no particularly limit on the types of the compounds that can be used in combination, but one to three of these compounds are preferably contained, and one to four of these compounds are more preferably contained. Since it is effective for solubility to select compounds having wide molecular weight distributions, one compound is preferably selected from the compounds represented by formulae (L-6.1) and (L-6.2), one compound is preferably selected from the compounds represented by formulae (L-6.4) and (L-6.5), one compound is preferably selected from the compounds represented by formulae (L-6.6) and (L-6.7), and one compound is preferably selected from the compounds represented by formulae (L-6.8) and (L-6.9), and these selected compounds are preferably appropriately combined. In particular, compounds represented by formulae (L-6.1), (L-6.3), (L-6.4), (L-6.6), and (L-6.9) are preferably contained.

Furthermore, the compounds represented by general formula (L-6) are preferably compounds represented by, for example, formulae (L-6.10) to (L-6.17), among these, a compound represented by formula (L-6.11) is preferable.

[Chem. 51]

(L-6.10)

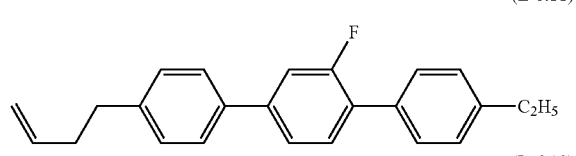

(L-6.11)

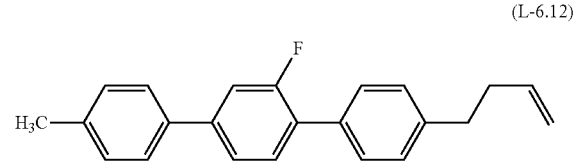

(L-6.12)

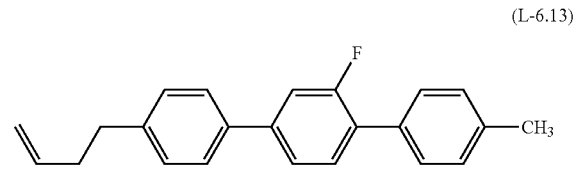

(L-6.13)

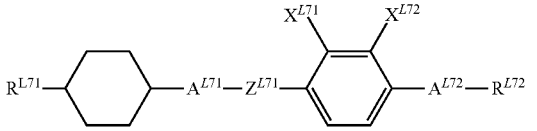

(L-6.14)

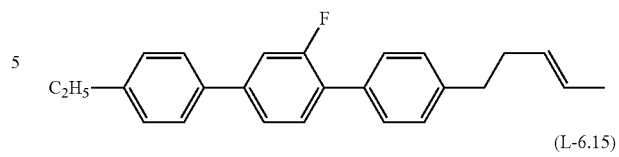

(L-6.15)

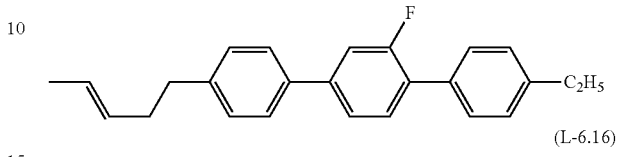

(L-6.16)

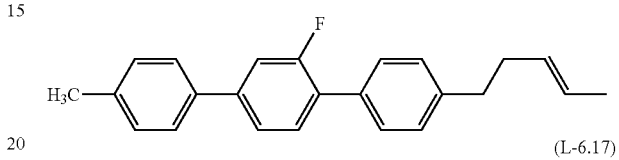

(L-6.17)

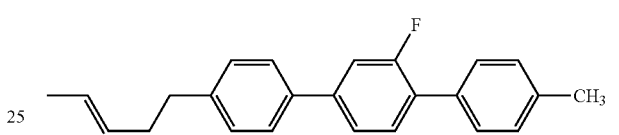

The lower limit of the preferable content of these compounds relative to the total amount of the liquid crystal composition of the present invention is 1 mass % (hereinafter, mass % is simply referred to as %), 2%, 3%, 5%, or 7%. The upper limit of the preferable content of these compounds is 20%, 15%, 13%, 10%, or 9%.

Compounds represented by general formula (L-7) are as follows.

[Chem. 52]

(L-7)

$$R^{L71}-\bigcirc-A^{L71}-Z^{L71}-\bigcirc\overset{X^{L71}}{\underset{X^{L72}}{}}-A^{L72}-R^{L72}$$

(In the formula, $R^{L71}$ and $R^{L72}$ are each independently the same as $R^{L1}$ and $R^{L2}$ in general formula (L), $A^{L71}$ and $A^{L72}$ are each independently the same as $A^{L2}$ and $A^{L3}$ in general formula (L) in which hydrogen atoms on $A^{L71}$ and $A^{L72}$ may each independently be substituted with a fluorine atom, $X^{L71}$ is the same as $Z^{L2}$ in general formula (L), and $X^{L71}$ and $X^{L72}$ each independently represent a fluorine atom or a hydrogen atom.)

In the formula, $R^{L71}$ and $R^{L72}$ preferably each independently represent an alkyl group having 1 to 5 carbon atoms, an alkenyl group having 2 to 5 carbon atoms, or an alkoxy group having 1 to 4 carbon atoms, $A^{L71}$ and $A^{L72}$ preferably each independently represent a 1,4-cyclohexylene group or a 1,4-phenylene group, hydrogen atoms on $A^{L71}$ and $A^{L72}$ may each independently be substituted with a fluorine atom, $Q^{L71}$ preferably represents a single bond or COO— and preferably represents a single bond, and $X^{L71}$ and $X^{L72}$ preferably each represent a hydrogen atom.

There is no specific limit on the types of the compounds that can be used in combination, and the compounds are used in combination according to the desired properties such as solubility at low temperatures, transition temperature, electrical reliability, and birefringence index. The number of types of the compounds to be used is, for example, 1, 2, 3, or 4 in one embodiment of the present invention.

In the liquid crystal composition of the present invention, the content of the compound represented by general formula (L-7) needs to be appropriately adjusted according to the desired properties, such as solubility at low temperatures, transition temperature, electrical reliability, birefringence index, process compatibility, drop marks, image-sticking, and dielectric anisotropy.

The lower limit of the preferable content of the compound represented by formula (L-7) relative to the total amount of the liquid crystal composition of the present invention is 1 mass % (hereinafter, mass % is simply referred to as %), 2%, 3%, 5%, 7%, 10%, 14%, 16%, or 20%. The upper limit of the preferable content of the compound represented by formula (L-7) relative to the total amount of the liquid crystal composition of the present invention is 30%, 25%, 23%, 20%, 18%, 15%, 10%, or 5%.

When an embodiment in which the composition of the present invention has a high Tni is desirable, the amount of the compound represented by formula (L-7) is preferably relatively large, and when an embodiment in which the viscosity is low is desirable, the amount is preferably relatively small.

Furthermore, the compounds represented by general formula (L-7) are preferably compounds represented by formulae (L-7.1) to (L-7.4), and preferably a compound represented by formula (L-7.2).

[Chem. 53]

(L-7.1)
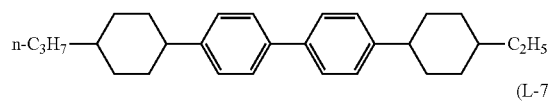

(L-7.2)
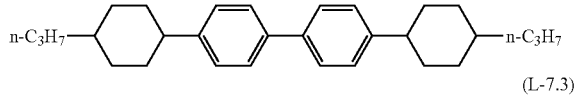

(L-7.3)
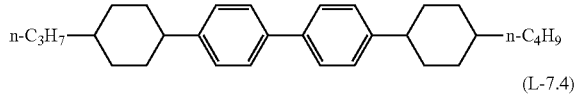

(L-7.4)
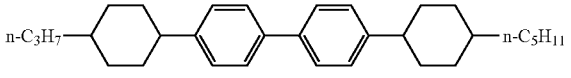

Furthermore, the compounds represented by general formula (L-7) are preferably compounds represented by formulae (L-7.11) to (L-7.13), and preferably a compound represented by formula (L-7.11).

[Chem. 54]

(L-7.11)
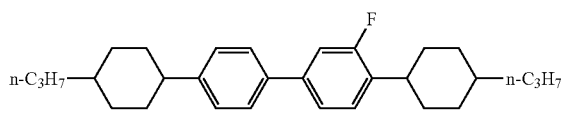

(L-7.12)
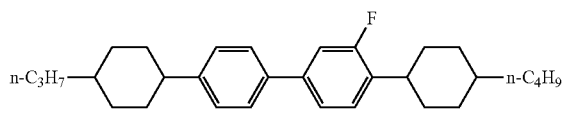

(L-7.13)
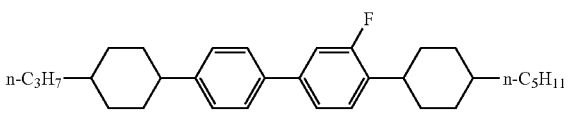

Furthermore, the compounds represented by general formula (L-7) are compounds represented by formulae (L-7.21) to (L-7.23). A compound represented by (L-7.21) is preferable.

[Chem. 55]

(L-7.21)
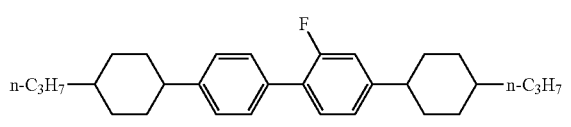

(L-7.22)
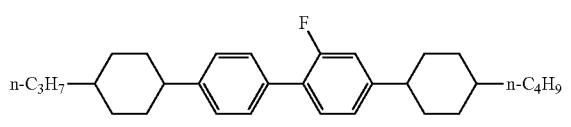

(L-7.23)
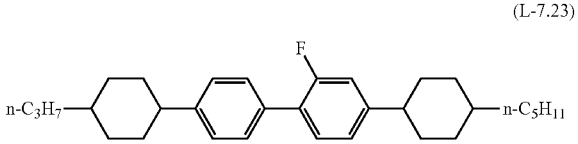

Furthermore, the compounds represented by general formula (L-7) are preferably compounds represented by formulae (L-7.31) to (L-7.34), and preferably a compound represented by formula (L-7.31) or/and (L-7.32).

[Chem. 56]

(L-7.31)
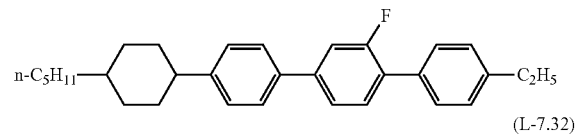

(L-7.32)
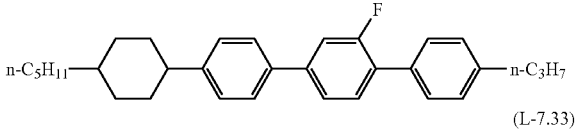

(L-7.33)

(L-7.34)

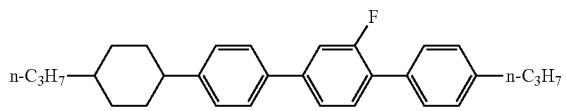

Furthermore, the compounds represented by general formula (L-7) are preferably compounds represented by formulae (L-7.41) to (L-7.44), and preferably a compound represented by formula (L-7.41) or/and (L-7.42).

[Chem. 57]

(L-7.41)

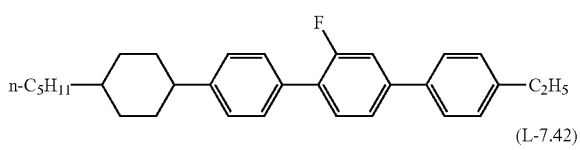

(L-7.42)

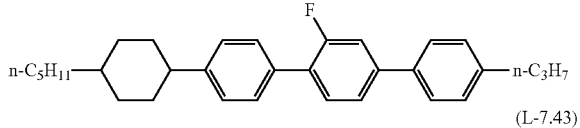

(L-7.43)

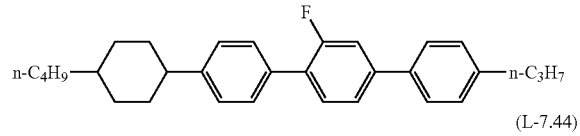

(L-7.44)

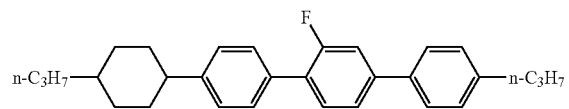

The liquid crystal composition of the present invention preferably contains 100 ppm to 1 mass % of additives (antioxidant, UV absorber, etc.).

The liquid crystal composition of the present invention can be used for a wide range of the nematic phase-isotropic liquid phase transition temperature (Tni); however, the nematic phase-isotropic liquid phase transition temperature (Tni) is preferably 60 to 120° C., more preferably 70 to 100° C., and particularly preferably 70 to 85° C.

The dielectric anisotropy Δε of the liquid crystal composition of the present invention at 25° C. is preferably −2.0 to −6.0, more preferably −2.5 to −5.0, and yet more preferably −2.5 to −3.5.

The refractive-index anisotropy Δn of the liquid crystal composition of the present invention at 25° C. is preferably 0.08 to 0.13 and more preferably 0.09 to 0.12. More specifically, in order to comply with a small cell gap, the refractive-index anisotropy of the liquid crystal composition of the present invention at 25° C. is preferably 0.10 to 0.12. Yet more specifically, in order to comply with a small cell gap (a cell gap of 3.4 μm or less), the refractive-index anisotropy is preferably about 0.9 to about 0.12, and in order to comply with a large cell gap (a cell gap of 3.5 μm or more), the refractive-index anisotropy is preferably about 0.08 to about 0.1.

The upper limit of the rotational viscosity ($\gamma_1$) of the liquid crystal composition of the present invention is preferably 150 (mPa·s) or less, more preferably 130 (mPa·s) or less, and yet more preferably 120 (mPa·s) or less. Meanwhile, the lower limit of the rotational viscosity ($\gamma_1$) is preferably 20 (mPa·s) or more, more preferably 30 (mPa·s) or more, yet more preferably 40 (mPa·s) or more, still more preferably 50 (mPa·s) or more, yet more preferably 60 (mPa·s) or more, and particularly preferably 70 (mPa·s) or more.

According to the liquid crystal composition of the present invention, Z, which is the function of the rotational viscosity and the refractive-index anisotropy, preferably exhibits a particular value.

$$Z=\gamma 1/(\Delta n)^2 \quad \text{[Math. 1]}$$

(In the mathematical formula, $\gamma_1$ represents the rotational viscosity, and Δn represents the refractive-index anisotropy.)

Z is preferably 13000 or less, more preferably 12000 or less, and particularly preferably 11000 or less.

When the liquid crystal composition of the present invention is used in an active matrix display element, the specific resistance thereof needs to be $10^{11}$ (Ω·m) or more, is preferably $10^{12}$ (Ω·m), and is more preferably $10^{13}$ (Ω·m) or more.

The liquid crystal composition according to the present invention can be used for a wide range of the nematic phase-isotropic liquid phase transition temperature (Tni); however, the transition temperature (Tni) is preferably 60 to 120° C., more preferably 70 to 110° C., and particularly preferably 75 to 100° C.

[Method for Producing Liquid Crystal Display Device]

Next, a method for producing a liquid crystal display device of the present invention is described with reference to FIG. 1.

An alignment film material containing polymerizable compounds having polymerizable groups or a polymerizable liquid crystal compound is applied to a surface of the first substrate 11 on which the common electrode 14 is formed and to a surface of the second substrate 12 on which the pixel electrode 15 is formed, and then heated to form vertical alignment films 16 and 17. When a polymerizable liquid crystal compound is used as an alignment film, a typical alignment film may be used as a base alignment film.

Here, an alignment film material containing a polymer having a thermally decomposable group is prepared by using any one of the aforementioned three methods.

When a first polymer compound is a polyimide, examples of the polymer compound precursor include a mixture of tetracarboxylic dianhydride and diisocyanate, a polyamic acid, and a polyimide solution in which a polyimide is dissolved or dispersed in a solvent. The polyimide content in the polyimide solution is preferably 1 mass % or more and 10 mass % or less and more preferably 3 mass % or more and 5 mass % or less.

When the first polymer compound is a polysiloxane, examples of the polymer compound precursor include a silicon compound having an alkoxy group, a silicon compound having a halogenated alkoxy group, and a polysiloxane solution prepared by mixing an alcohol and oxalic acid at a particular blend ratio, heating the resulting mixture to synthesize polysiloxane, and dissolving polysiloxane in a solvent.

If needed, a photo-cross-likable compound, a photopolymerization initiator, a solvent, and the like may be added to the alignment film material.

After preparing the alignment film material, the alignment film material is applied to or printed onto each of the first substrate 11 and the second substrate 12 such that the common electrode 14, the pixel electrode 15, and the slit portions (not illustrated) are covered. Moreover, by performing a drying step as necessary, a polymer having a thermally decomposable group containing a fluorine atom and/or a silicon atom segregates in the coated surface.

Next, a heat treatment (baking treatment) is performed in an environment of 120 to 300° C. In this manner, the polymer compound precursor and/or the compound represented by general formula (V-3) above contained in the applied or printed alignment film material or the polymerizable liquid crystal compound is polymerized and cured to form a polymer compound, and, at the same time, the fluorine atom and/or silicon atom-containing thermally decomposable group portion of the polymer having a fluorine atom and/or silicon atom-containing thermally decomposable group segregating in the coated surface leaves the polymer contained in the optically anisotropic body, thereby making the coated surface flat and smooth.

Note that in order to cause the thermally decomposable group portion bonded to the thermally decomposable group-containing polymer to leave, a baking treatment is preferably performed at 150 to 300° C. for 5 to 120 minutes and is more preferably performed at 180 to 250° C. for 10 to 60 minutes.

At this stage of the heating treatment, the vertical alignment ability that causes the liquid crystal molecules in the liquid crystal composition layer to align in a direction vertical to a substrate surface is generated.

Next, the first substrate 11 and the second substrate 12 are stacked on top of each other, and a liquid crystal molecule-containing liquid crystal composition layer 13 is sealed between these substrates.

Specifically, spacer projections, for example, plastic beads or the like, for securing the cell gap are scattered onto one of the surfaces of the first substrate 11 and the second substrate 12 where the vertical alignment films 16 and 17 are formed, and for example, a seal portion is printed by a screen printing method using an epoxy adhesive or the like.

Subsequently, the first substrate 11 and the second substrate 12 are arranged to oppose each other with the vertical alignment films 16 and 17 opposing each other, and are bonded with each other with the spacer projections and the seal portion therebetween, and then the liquid crystal composition containing liquid crystal molecules and, if needed, polymerizable compounds, is injected.

The seal portion is then cured by UV irradiation, heating, or the like so as to seal the liquid crystal composition between the first substrate 11 and the second substrate 12.

Next, a voltage is applied between the common electrode 14 and the pixel electrode 15 by using a voltage applying means. The voltage applied has, for example, a magnitude of 5 to 30 (V). The aforementioned application may involve applying charges to the first substrate and the second substrate substantially vertically in some cases. In this manner, an electric field that forms a particular angle with respect to the surface of the first substrate 11 adjacent to the liquid crystal composition layer 13 (the surface opposing the liquid crystal composition layer 13) and the surface of the second substrate 12 adjacent to the liquid crystal composition layer 13 (the surface opposing the liquid crystal composition layer 13) is formed, and liquid crystal molecules 19 become aligned while tilting in a particular direction from a direction normal to the first substrate 11 and the second substrate 12. Here, the tilt angle of the liquid crystal molecules 19 become substantially the same as the pretilt θ imparted to the liquid crystal molecules 19 in the step described below. Accordingly, it is possible to control the magnitude of the pretilt θ of the liquid crystal molecules 19 by appropriately adjusting the magnitude of the voltage (see FIG. 3).

Furthermore, by irradiating the liquid crystal composition layer 13 from the outer side of the first substrate 11, for example, with an ultraviolet ray (UV) while applying the voltage, the polymerizable group-containing compound that controls the alignment direction of liquid crystal molecules in the liquid crystal composition layer in the vertical alignment films 16 and 17 or polymerizable liquid crystal compounds, and the polymerizable compounds in the liquid crystal composition are polymerized to generate a high-molecular-weight polymer.

In such a case, the active energy ray irradiation intensity may or may not be constant, and, when the irradiation intensity is varied, the irradiation time at each irradiation intensity may be set as desired. However, when an irradiating step that involves two or more stages is employed, the irradiation intensity of the irradiation step of the second stage and onward is preferably selected to an intensity weaker than the irradiation intensity of the first stage, and the second stage and onward are preferably performed for a total irradiation time longer than the irradiation time of the first stage and preferably involve a larger total irradiation energy amount. When the irradiation intensity is varied discontinuously, the average irradiation light intensity in the first half of the total irradiation step time is desirably stronger than the average irradiation intensity of the second half, more desirably, the intensity immediately after start of irradiation is the strongest, and yet more preferably, the irradiation intensity constantly keeps decreasing to a particular value with passage of the irradiation time. In such a case, the UV intensity is preferably 0.5 mW/cm$^{-2}$ to 100 mW/cm$^{-2}$. However, in the first stage of the multistage irradiation or when the irradiation intensity is varied discontinuously, the maximum irradiation intensity in the entire irradiation step is preferably 10 mW/cm$^{-2}$ to 100 mW/cm$^{-2}$, and in the second or onward stage of the multilayer irradiation or when the irradiation intensity is varied discontinuously, the minimum irradiation intensity is more preferably 0.5 mW/cm$^{-2}$ to 50 mW/cm$^{-2}$. The total irradiation energy is preferably 10 J to 300 J, more preferably 50 J to 250 J, and yet more preferably 100 J to 250 J.

In such a case, the applied voltage may be AC or DC.

As a result, an alignment control ability (not illustrated) containing a vertical alignment film material fixed to the orientation control portions of the vertical alignment films 16 and 17 is obtained, and, furthermore, if needed, polymer layers 20 and 21 are formed thereon. In a non-driven state, the alignment control portions have a function (alignment control ability) of imparting a pretilt θ to the liquid crystal molecules 19 near the interfaces between the liquid crystal composition layer 13 and the polymer layers 20 and 21 (the vertical alignment films 16 and 17). Although the ultraviolet ray UV here is radiated from the outer side of the first substrate 11, it may be radiated from the outer side of the second substrate 12, or from the outer side of the first substrate 11 and the outer side of the second substrate 12.

As such, according to a liquid crystal display device of the present invention, the liquid crystal molecules 19 in the liquid crystal composition layer 13 have a particular pretilt θ. In this manner, compared to a liquid crystal display device not subjected to a pretilt treatment or a liquid crystal display apparatus equipped with such a liquid crystal display device, the response speed relative to the driving voltage can be greatly improved.

In the liquid crystal display device of the present invention, the polymer compound precursor that constitutes the vertical alignment films 16 and 17 is preferably a non-photosensitive polyimide precursor.

A particular amount of a photopolymerizable monomer (that is, a precursor of a liquid crystal alignment supplementary material) is mixed with at least one liquid crystal alignment material. The liquid crystal alignment material is applied to each substrate to form a liquid crystal alignment film, and liquid crystal is sandwiched between the two substrates. Subsequently, a pretilt angle is imparted to the liquid crystal by U ray irradiation while a particular voltage is applied to a liquid crystal-driving electrode. This is presumably because the monomer in the alignment film dissolved in the liquid crystal, and the UV ray treatment turned the monomer into a polymer (into a liquid crystal alignment supplementary material).

Typically, the process of forming a liquid crystal alignment film includes a step of baking at a high temperature of 200 degrees or more in order to completely remove the organic solvent. In the case of a typical polymerizable group-containing monomer, the thermal stability is poor, polymerizable group reacts during high-temperature baking, and thus, the monomer does not withstand the baking and rarely dissolves into the liquid crystal layer.

To address this, the inventors of the present invention have conducted extensive studies and found that this issue can be resolved by using an alignment film material in which a polymerizable compound having a particular chemical structure is mixed. Thus, the present invention has been made.

EXAMPLES

<Liquid crystal>
(Side chain)
-n —$C_nH_{2n+1}$ linear alkyl group having n carbon atoms
n- $C_nH_{2n+1}$— linear alkyl group having n carbon atoms
-On —$OC_nH_{2n+1}$ linear alkoxy group having n carbon atoms
nO- $C_nH_{2n+1}O$— linear alkoxy group having n carbon atoms
—V —CH=$CH_2$
V— $CH_2$=CH—
—V— —CH=CH—
—V1 —CH=CH—$CH_3$
1V— $CH_3$—CH=CH—
-2V —$CH_2$—$CH_2$—CH=$CH_2$
V2- $CH_2$=CH—$CH_2$—$CH_2$—
-2V1 —$CH_2$—$CH_2$—CH=CH—$CH_3$
1V2- $CH_3$—CH=CH—$CH_2$—$CH_2$—
—F —F
—$OCF_3$ —$OCF_3$
(Linking Group)
—CF2O— —$CF_2$—O—
—OCF2- —O—$CF_2$—
-1O- —$CH_2$—O—
-O1- —O—$CH_2$—
—COO— —COO—
—OCO— —OCO—
(Cyclic Structure)

[Chem. 58]

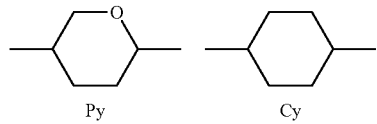

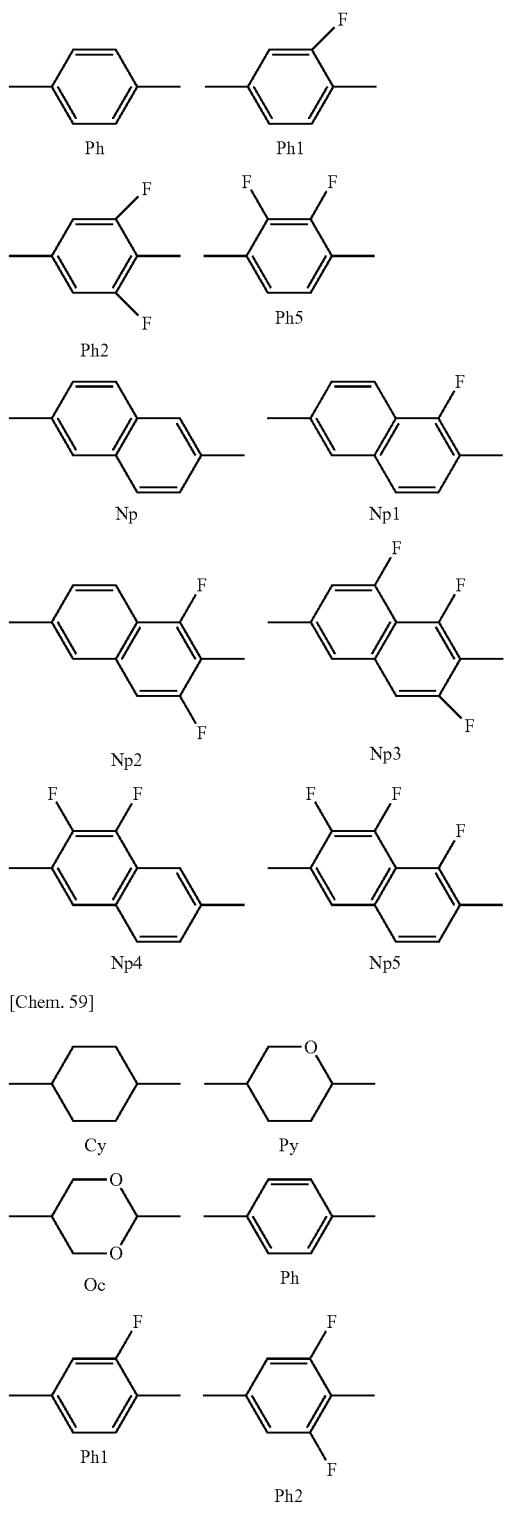

[Chem. 59]

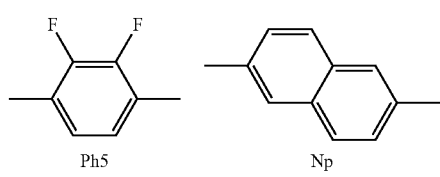

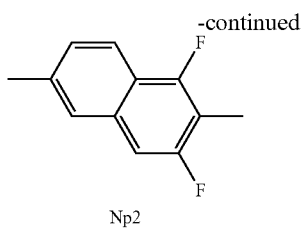

Np2

In the examples, the measured properties are as follows. The measurement was performed according to a method defined in JEITA ED-2521B unless otherwise noted.

Tni: nematic phase-isotropic liquid phase transition temperature (° C.)

Δn: refractive-index anisotropy at 25° C.

T: transmittance, simulation using LCD Master

γ1: rotational viscosity at 25° C. (mPa·s)

Δε: dielectric anisotropy at 25° C.

K11: elastic modulus K11 (pN) at 25° C.

K33: elastic modulus K33 (pN) at 25° C.

S: space between adjacent branches (μm), measured with a microscope d: cell gap (μm), optically measured with OPTIPRO produced by Shintech, Inc.

Examples 1 to 9 and Comparative Example 1

Liquid crystal compositions LC-1 to LC-4 were prepared. In LC-2 to LC-4, Δn was changed according to d from LC-1. In addition, in preparing LC-2 to LC-4, the following compounds were used as appropriate.

3-Cy-Cy-V
3-Cy-Cy-V1
R-Cy-Ph5-OR'
R-Ph-Ph5-OR'
R-Cy-Cy-Ph5-OR'

TABLE 1

|  | LC-1 | LC-2 | LC-3 | LC-4 |
|---|---|---|---|---|
| Tni | 75.6 | → | ← | ← |
| Δn | 0.090 | 0.076 | 0.114 | 0.136 |
| no | 1.481 | 1.479 | 1.488 | 1.494 |
| Δε | −3.0 | ← | ← | ← |
| ε⊥ | 6.4 | ← | ← | ← |
| γ1 | 91 | ← | ← | ← |
| K11 | 15.2 | ← | ← | ← |
| K33 | 13.0 | ← | ← | ← |
| 5-Ph-Ph-1 | 9 | | | |
| 3-Cy-Cy-2 | 21 | | | |
| 3-Cy-Cy-4 | 8 | | | |
| 3-Cy-Cy-5 | 4 | | | |
| 3-Cy-Ph—Ph-1 | 7 | | | |
| 3-Cy-Ph—Ph-3 | 2 | | | |
| 3-Cy-1O—Ph5—O1 | 7 | | | |
| 3-Cy-1O—Ph5—O2 | 8 | | | |
| 2-Cy-Cy-1O—Ph5—O2 | 9 | | | |
| 3-Cy-Cy-1O—Ph5—O2 | 9 | | | |
| 3-Cy-Ph—Ph5—O3 | 7 | | | |
| 3-Cy-Ph—Ph5—O4 | 9 | | | |

Figure 6:
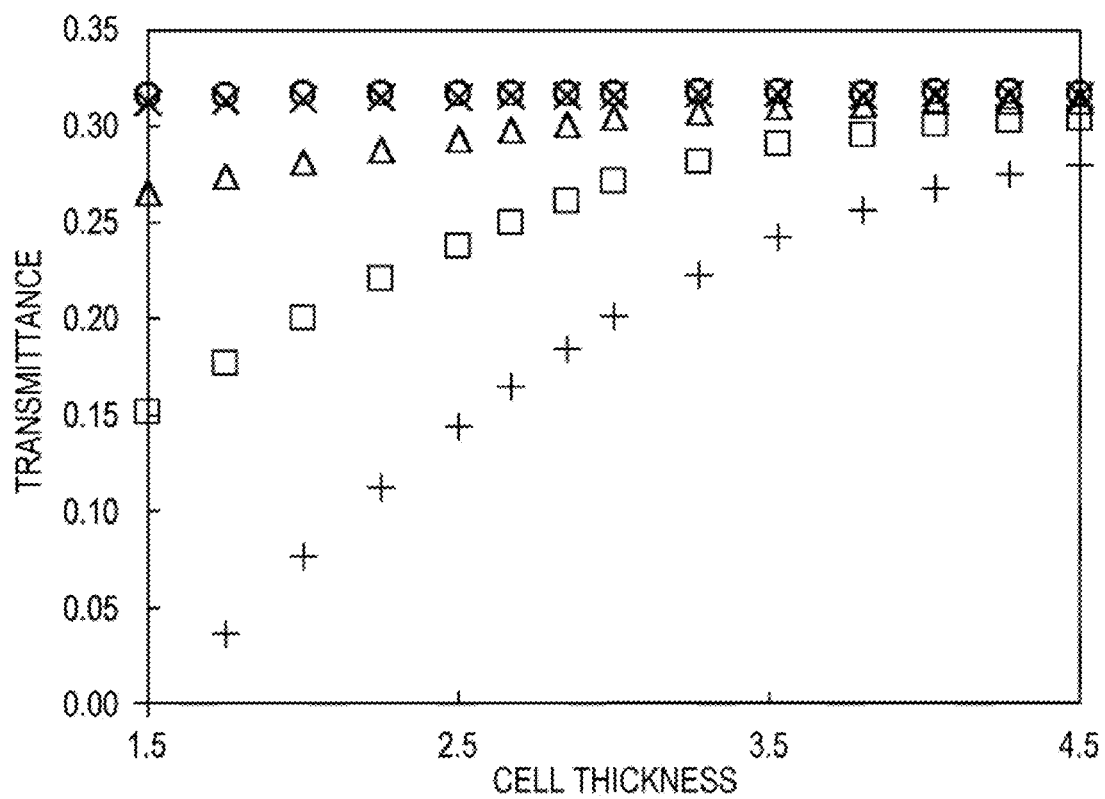
FIG. 6 shows the relationship between d, S, and transmittance.
Figure 7:
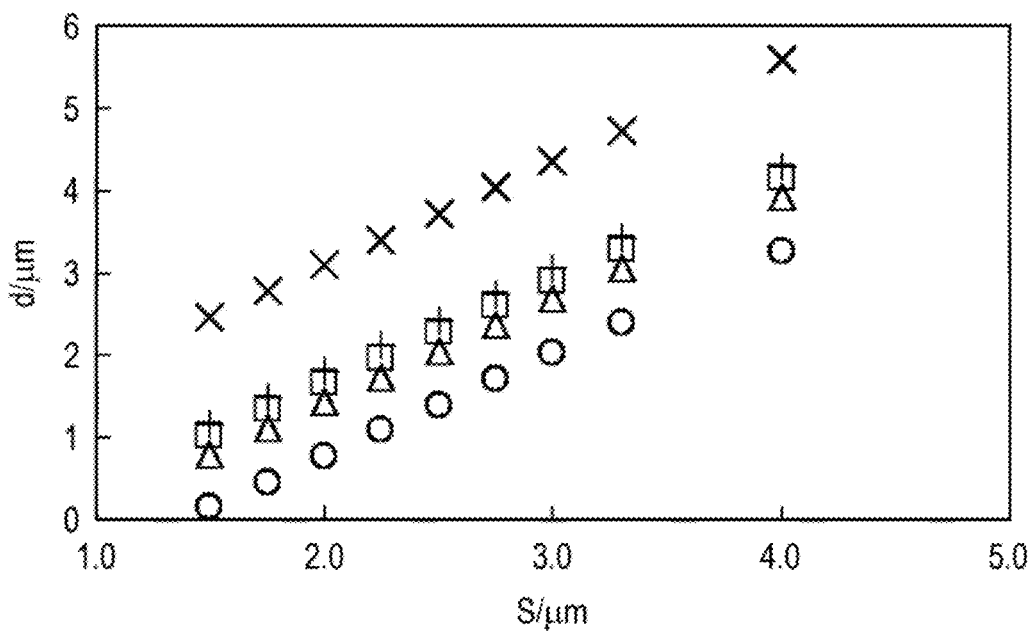
FIG. 7 shows the relationship between S and d when the transmittance (T) is a particular value.
Figure 8:
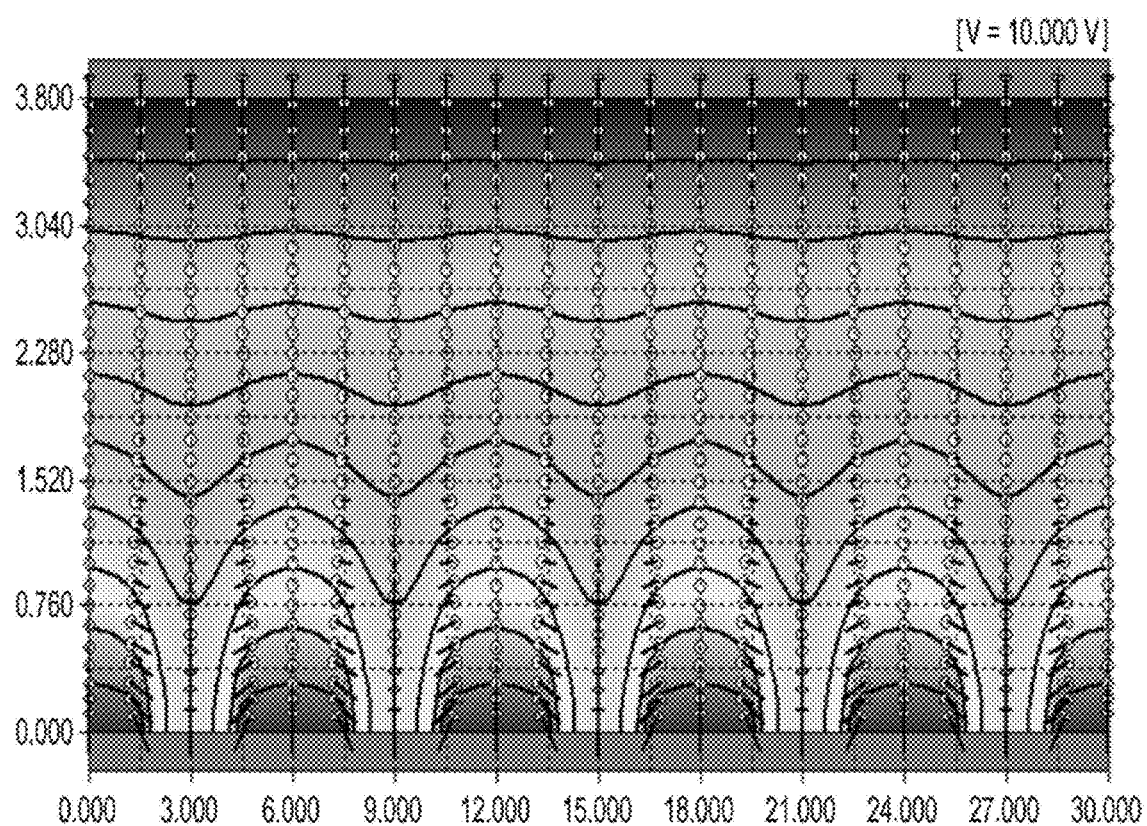
FIG. 8 illustrates the state of the equipotential plane when d=3.8 μm, S=3.0 μm, L=3.0 μm and a voltage of 10 V is applied between the first electrode and the second electrode in the liquid crystal display device illustrated in FIG. 5, and illustrates simulation results schematically representing the state of liquid crystal molecules in that state.

FIG. 6 is a graph plotting the change in T on d when S is a particular value. The results indicated in FIGS. 6 and 7 are results of simulation that used various physical property values described in Table 2 on the basis of the physical properties of actually prepared liquid crystal compositions.

TABLE 2

| Polarizing plate (Upper portion) | Thickness/μm | | 180 |
|---|---|---|---|
| | Angle/° | | 45 |
| Glass | Thickness/μm | | 700 |
| Alignment film | Anchoring force/J/m² | φ | 1.00E−04 |
| | | θ | 1.00E−04 |
| Liquid crystal layer | Pretilt angle/° | | 89 |
| | Pretwist angle/° | | 90 |
| | Pretilt angle/° | | 89 |
| Alignment film | Anchoring force/J/m² | φ | 1.00E−04 |
| | | θ | 1.00E−04 |
| Glass | Thickness/μm | | 700 |
| Polarizing plate (Lower portion) | Thickness/μm | | 180 |
| | Angle/° | | 315 |

○ indicates a plot of the relationship between d and T when S is 0, x indicates a plot when S is 1, Δ indicates a plot when S is 2, □ indicates a plot when S is 3, and + indicates a plot when S is 4. It was found that T decreases as d decreases.

The results of the physical property values that used the aforementioned liquid crystal compositions are as illustrated in FIG. 7. In FIG. 7, ○ indicates a plot of the values of S and d when T is 0.26, Δ indicates a plot when T is 0.27, □ indicates a plot when T is 0.28, | indicates a plot when T is 0.29, and x indicates a plot when T is 0.3.

The above-described results show that when α in S=(d−α)/1.25 is adjusted to −1.1 to 0.6, the transmittance becomes 0.26 or more, and thus the liquid crystal display device of the present invention has excellent display properties.

[Chem. 60]

RM-1

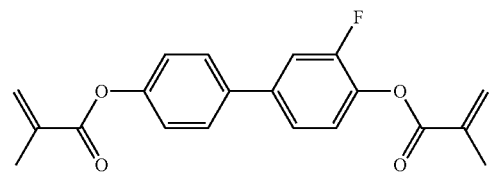

RM-2

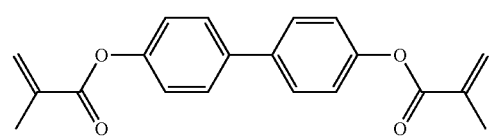

RM-3

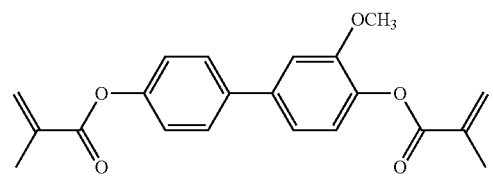

-continued

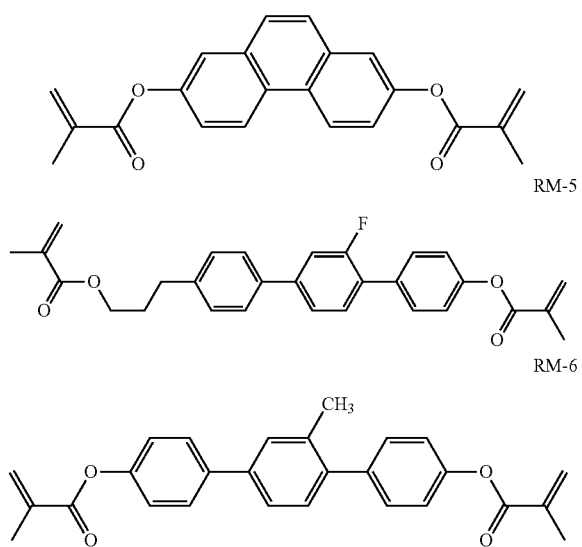

Examples 10 and 11

To 99.6 wt % of liquid crystal composition LC-1, 0.4 wt % of RM-1 was added, and homogeneously dissolved to prepare a polymerizable liquid crystal composition CLC-1.

To 99.7 wt % of liquid crystal composition LC-1, 0.3 wt % of RM-2 was added, and homogeneously dissolved to prepare a polymerizable liquid crystal composition CLC-2.

The polymerizable liquid crystal compositions CLC-1 and CLC-2 were held on a panel having an alignment film and a fishbone pattern electrode, and then a sealing agent was cured to form a liquid crystal composition layer. The obtained liquid crystal display device was irradiated with an ultraviolet ray while the voltage was being applied so as to cure the polymerizable compound having the aforementioned reactive group. As a result, a liquid crystal display device CLCD-1 of Example 10 and a liquid crystal display device CLCD-2 of Example 11 were obtained. The liquid crystal display devices of Examples 10 and 11 had a transmittance of 0.26 or more, and it was found that the liquid crystal display device of the present invention has excellent display properties.

[Chem. 61]

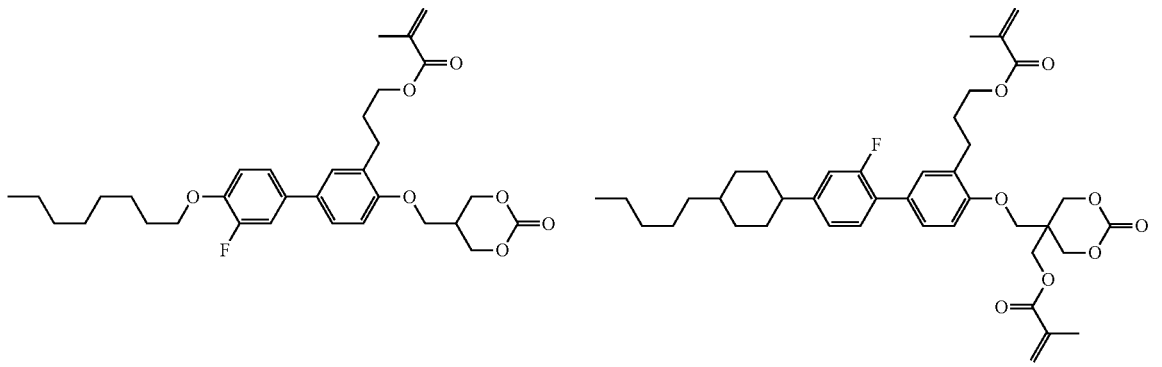

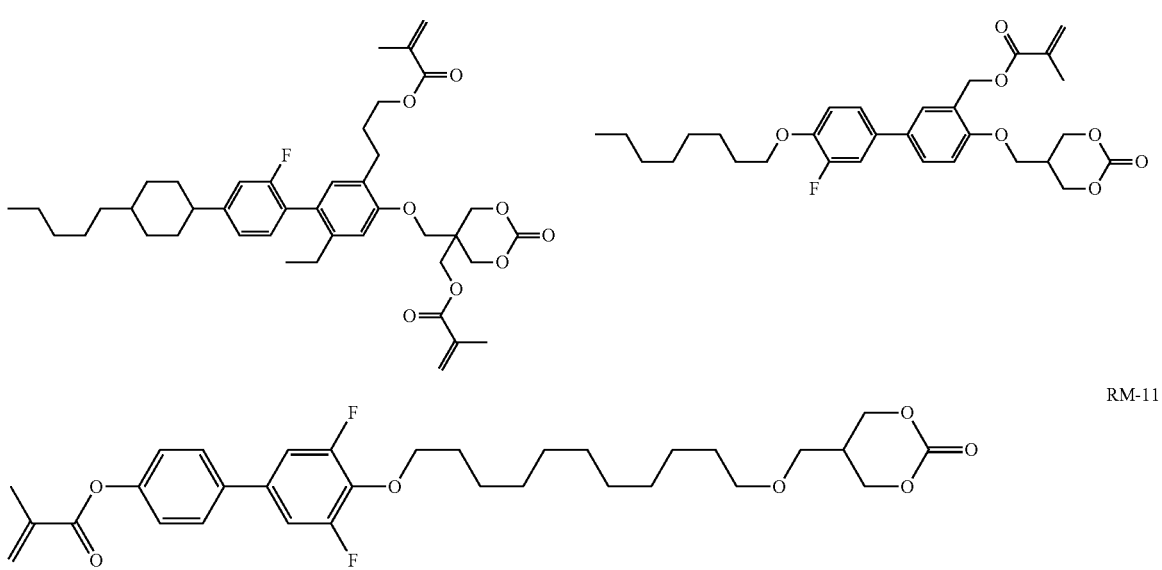

[Chem. 62]

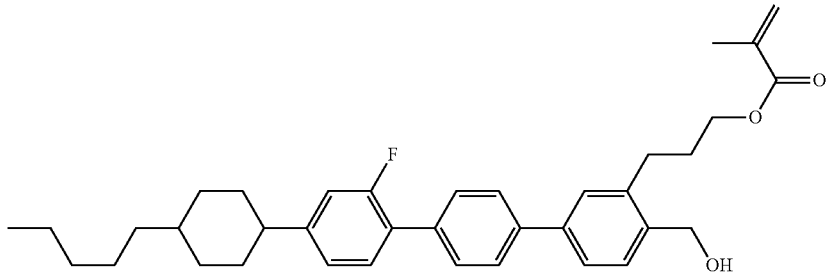

RM-12

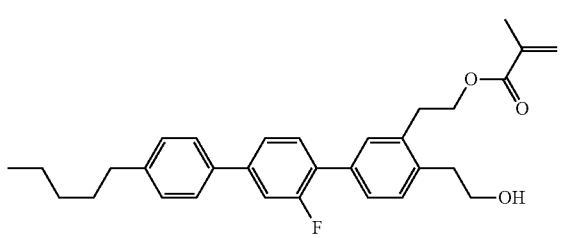

RM-13

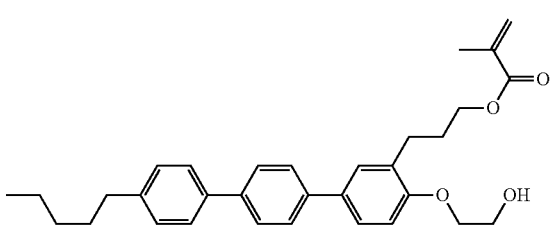

RM-14

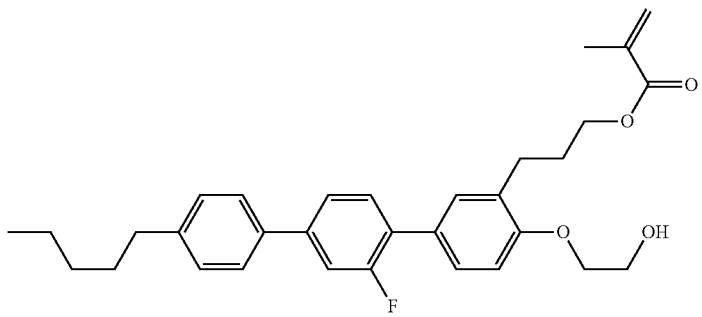

RM-15

Examples 12 and 13

To 99.2 wt % of liquid crystal composition LC-1, 0.3 wt % of RM-1 and 0.5 wt % of RM-7 were added, and homogeneously dissolved to prepare a polymerizable liquid crystal composition CLC-3.

To 99.7 wt % of liquid crystal composition LC-1, 0.3 wt % of RM-2 and 0.4 wt % of RM-9 were added, and homogeneously dissolved to prepare a polymerizable liquid crystal composition CLC-4.

The polymerizable liquid crystal compositions CLC-3 and CLC-4 were held on a panel having no alignment film but a fishbone pattern, and then the sealing agent was cured to form a liquid crystal composition layer. The obtained liquid crystal display device was irradiated with an ultraviolet ray while the voltage was being applied so as to cure the polymerizable compound having the aforementioned reactive group. As a result, a liquid crystal display device CLCD-3 of Example 12 and a liquid crystal display device CLCD-4 of Example 13 were obtained. The liquid crystal display devices of Examples 12 and 13 had a transmittance of 0.26 or more, and it was found that the liquid crystal display devices of the present invention has excellent display properties.

The invention claimed is:

1. A liquid crystal display device comprising:
a first substrate having a first electrode formed on or above the first substrate;
a second substrate having a second electrode formed on or above the second substrate the first electrode being oppose to the second electrode; and
a liquid crystal layer disposed between the first substrate and the second substrate and substantially vertically aligned with respect to the first and second substrates when no voltage is applied between electrodes,
wherein the first electrode has a fishbone pattern comprising:
a first main electrode line partitioning between a first region and a second region;
first electrode branches formed in the first region, the first electrode branches branched from the first main electrode line, the first electrode branches being parallel to each other and having a space of S μm between adjacent first electrode branches;
second electrode branches formed in the second region, the second electrode branches branched from the first main electrode line, the second electrode branches being parallel to each other and having the space of S µm between adjacent second electrode branches;

wherein the first electrode branches in the first region are symmetric with the second electrode branches in the second region with respect to the first main electrode line, wherein an inter-substrate distance of d µm between the first substrate and the second substrate satisfy a relationship of formula (1):

$$(d-0.6)/1.25 < S < (d+1.1)/1.25 \qquad \text{formula (1),}$$

wherein d is 1.5 to 3.0, S is 1.5 to 3.4, and, wherein the liquid crystal layer has a refractive-index anisotropy Δn of 0.089 to 0.360, wherein a value of a product Δn·d×1000 of a refractive-index anisotropy (Δn) of the liquid crystal layer and d is 320 to 360 nm.

2. The liquid crystal display device according to claim 1, using a liquid crystal material having a negative dielectric anisotropy.

3. The liquid crystal display device according to claim 1, wherein an average angle (θ) formed between liquid crystal molecules in the liquid crystal layer and the first substrate is 85° to 89.8°.

4. The liquid crystal display device according to claim 1, having a polymer for adjusting θ, the polymer being disposed between the first and second substrates.

5. The liquid crystal display device according to claim 1, wherein a liquid crystal composition in the liquid crystal layer contains one compound or two or more compounds selected from the group consisting of compounds represented by general formula (N-1), general formula (N-2), and general formula (N-3) below:

(N-1)

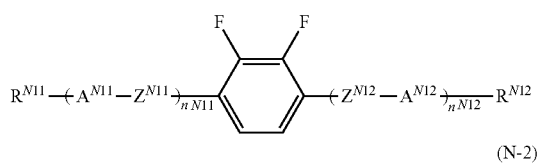

(N-2)

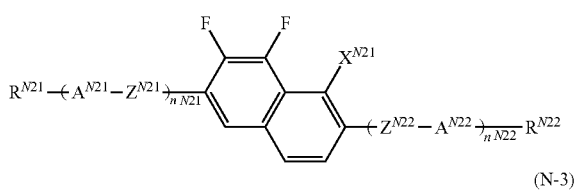

(N-3)

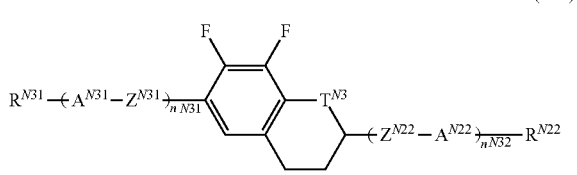

wherein the formulae $R^{N11}$, $R^{N12}$, $R^{N21}$, $R^{N22}$, $R^{N31}$, and $R^{N32}$ each independently represent an alkyl group having 1 to 8 carbon atoms, in which one —CH$_2$— or two or more non-adjacent —CH$_2$— in the alkyl group may each independently be substituted with —CH=CH—, —C≡C—, —O—, —CO—, —COO—, or —OCO—, $A^{N11}$, $A^{N12}$, $A^{N21}$, $A^{N22}$, $A^{N31}$, and $A^{N32}$ each independently represent a group selected from the group consisting of:

(a) a 1,4-cyclohexylene group wherein one —CH$_2$— or two or more non-adjacent —CH$_2$— present in this group may each be substituted with —O—, (b) a 1,4-phenylene group wherein one —CH= or two or more non-adjacent —CH= present in this group may each be substituted with —N=, and (c) a naphthalene-2,6-diyl group, a 1,2,3,4-tetrahydronaphthalene-2,6-diyl group, or a decahydronaphthalene-2,6-diyl group wherein one —CH= or two or more non-adjacent —CH= present in the naphthalene-2,6-diyl group or the 1,2,3,4-tetrahydronaphthalene-2,6-diyl group may each be substituted with —N=, and the groups (a), (b), and (c) described above may each independently be substituted with a cyano group, a fluorine atom, or a chlorine atom, $Z^{N11}$, $Z^{N12}$, $Z^{N21}$, $Z^{N22}$, $Z^{N31}$, and $Z^{N32}$ each independently represent a single bond, —CH$_2$CH$_2$—, —(CH$_2$)$_4$—, —OCH$_2$—, —CH$_2$O—, —COO—, —OCO—, —OCF$_2$—, -CF$_2$O—, —CH=N—N=CH—, —CH=CH—, —CF=CF—, or —C≡C—, $X^{N21}$ represents a hydrogen atom or a fluorine atom, $T^{N31}$ represents —CH$_2$— or an oxygen atom, and $n^{N11}$, $n^{N12}$, $n^{N21}$, $n^{N22}$, $n^{N31}$, and $n^{N32}$ each independently represent an integer of 0 to 3 but $n^{N11}+n^{N12}$, $n^{N21}+n^{N22}$, and $n^{N31}+n^{N32}$ are each independently 1, 2, or 3, and when there are more than one $A^{N11}$ to $A^{N32}$ and $Z^{N11}$ to $Z^{N32}$, they may the same or different.

6. The liquid crystal display device according to claim 1, wherein a liquid crystal composition in the liquid crystal layer further contains one compound or two or more compounds selected from the group of compounds represented by general formula (L):

(L)

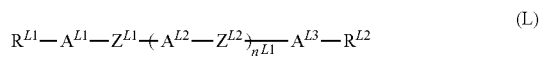

wherein the formula, $R^{L1}$ and $R^{L2}$ each independently represent an alkyl group having 1 to 8 carbon atoms, in which one —CH$_2$— or two or more non-adjacent —CH$_2$— in the alkyl group may each independently be substituted with —CH=CH—, —C≡C—, —O—, —CO—, —COO—, or —OCO—, $n^{L1}$ represents 0, 1, 2, or 3, $A^{L1}$, $A^{L2}$, and $A^{L3}$ each independently represent a group selected from the group consisting of:

(a) a 1,4-cyclohexylene group wherein one —CH$_2$— or two or more non-adjacent —CH$_2$— present in this group may each be substituted with —O—, (b) a 1,4-phenylene group wherein one —CH= or two or more non-adjacent —CH= present in this group may each be substituted with —N=, and (c) a naphthalene-2,6-diyl group, a 1,2,3,4-tetrahydronaphthalene-2,6-diyl group, or a decahydronaphthalene-2,6-diyl group wherein one —CH= or two or more non-adjacent —CH= present in the naphthalene-2,6-diyl group or the 1,2,3,4-tetrahydronaphthalene-2,6-diyl group may each be substituted with —N=, and the groups (a), (b), and (c) described above may each independently be substituted with a cyano group, a fluorine atom, or a chlorine atom, $Z^{L1}$ and $Z^{L2}$ each independently represent a single bond, —CH$_2$CH$_2$—, —(CH$_2$)$_4$—, —OCH$_2$—, —CH$_2$O—, —COO—, —OCO—, —OCF$_2$—, -CF$_2$O—, —CH=N—N=CH—, —CH=CH—, —CF=CF—, or —C≡C—, and when $n^{L1}$ is 2 or 3 and there are more than one $A^{L2}$, they may be the same or different, and when $n^{L1}$ is 2 or 3 and there are more than one $Z^{L3}$, they may be the same or different but the compounds represented by general formula (N-1), general formula (N-2), and general formula (N-3) are excluded.

7. The liquid crystal display device according to claim 4, wherein the polymer is a polymer of a polymerizable compound represented by general formula (ii);

(ii)

wherein the formula,
$Z^{i1}$ represents a single bond, —CH=CH—, —CF=CF—, —C≡C—, —COO—, —OCO—, —CF$_2$O—, —OCF$_2$—, or an alkylene group having 2 to 20 carbon atoms in which one —CH$_2$— or two or more non-adjacent —CH$_2$— in the alkylene group may each be substituted with —O—, —COO—, or —OCO—,
$A^{i1}$ represents a divalent six-membered ring aromatic group, a divalent six-membered ring heteroaromatic group, a divalent six-membered ring aliphatic group, a divalent six-membered ring heteroaliphatic group, or a single bond, in which hydrogen atoms in these cyclic structures may be substituted with a halogen atom and/or -Sp$^{i1}$-R$^{i1}$,
when there are more than one $Z^{i1}$ and $A^{i1}$, they may be the same or different,
$m^{i1}$ represents an integer of 1 to 5,
$K^{i1}$ represents a hydroxy group, an amino group, -Sp$^{i1}$-R$^{i1}$, or a structure represented by any of formula (K-1) to formula (K-8) below:

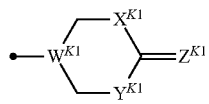
(K-1)

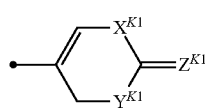
(K-2)

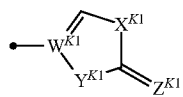
(K-3)

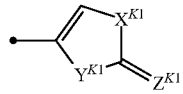
(K-4)

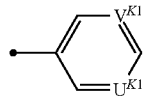
(K-5)

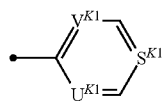
(K-6)

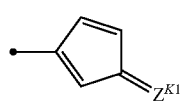
(K-7)

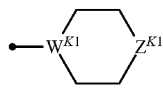
(K-8)

wherein the formulae,
$W^{K1}$ represents a methine group or a nitrogen atom,
$X^{K1}$ and $Y^{K1}$ each independently represent —CH$_2$—, an oxygen atom, or a sulfur atom,
$Z^{K1}$ represents an oxygen atom or a sulfur atom, and
$U^{K1}$, $V^{K1}$, and $S^{K1}$ each independently represent a methine group or a nitrogen atom, but a combination of $U^{K1}$ representing a methine group, $V^{K1}$ representing a methine group, and $S^{K1}$ representing a nitrogen atom is excluded,
wherein in formula (i) and formulae (K-1) to (K-8), a black dot on the left end represents an atomic bond,
Sp$^{i1}$ represents a linear alkylene group having 1 to 18 carbon atoms, a branched alkylene group having 1 to 18 carbon atoms, or a single bond, in which one —CH$_2$— or two or more non-adjacent —CH$_2$— in the alkylene group may each be substituted with —O—, —COO—, or —OCO—, and
R$^{i1}$ represents a hydrogen atom or a substituent selected from the group consisting of formulae (R-1) to (R-15):

[Chem. 3]

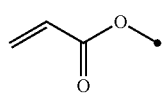
(R-1)

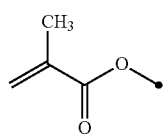
(R-2)

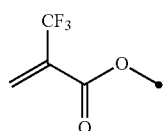
(R-3)

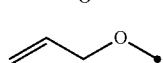
(R-4)

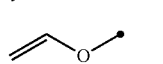
(R-5)

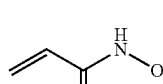
(R-6)

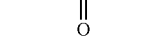
(R-7)

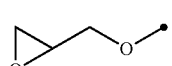
(R-8)

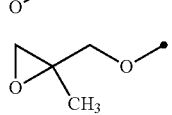
(R-9)

-continued

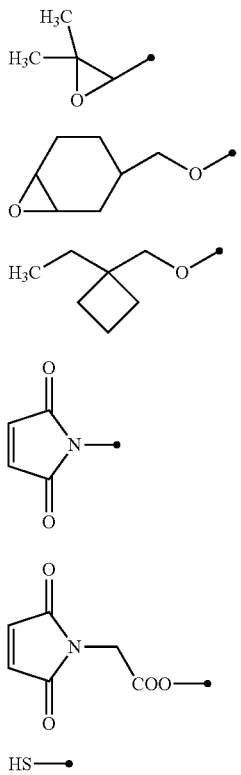

(R-10)
(R-11)
(R-12)
(R-13)
(R-14)
(R-15)

wherein the formulae, a black dot on the right end represents an atomic bond, wherein when the identically represented substituents are present within a molecule, they may be the same or different.

8. The liquid crystal display device according to claim 1, wherein no polyimide alignment film is disposed on at least one of the first substrate and the second substrate.

9. The liquid crystal display device according to claim 1, wherein the first main electrode line extends horizontally, the fishbone pattern further comprising:
a second main electrode line extending perpendicular to the first main electrode line, thereby forming the first region, the second region, a third region and a fourth region in this order clockwise which are partitioned by the first main electrode line and the second main electrode line;
third electrode branches formed in the third region, the third electrode branches being parallel to each other and having the space of S μm between adjacent third electrode branches;
fourth electrode branches formed in the fourth region, the fourth electrode branches being parallel to each other and having the space of S μm between adjacent fourth electrode branches,
wherein the first electrode branches are branched from the first main electrode line or the second main electrode line, the second electrode branches are branched from the first main electrode line or the second main electrode line, the third electrode branches are branched from the first main electrode line or the second main electrode line, and the fourth electrode branches are branched from the first main electrode line or the second main electrode line,
wherein the second electrode branches in the second region are symmetric with the third electrode branches in the third region with respect to the second main electrode line,
wherein the third electrode branches in the third region are symmetric with the fourth electrode branches in the fourth region with respect to the first main electrode line,
wherein the fourth electrode branches in the fourth region are symmetric with the first electrode branches in the first region with respect to the second main electrode line.

* * * * *